US008065383B2

(12) United States Patent
Carlson et al.

(10) Patent No.: US 8,065,383 B2
(45) Date of Patent: Nov. 22, 2011

(54) CUSTOMIZABLE AND MEASURABLE INFORMATION FEEDS FOR PERSONALIZED COMMUNICATION

(75) Inventors: Hilding Mark Carlson, Portola Valley, CA (US); Vitaly Eliashberg, Sunnyvale, CA (US)

(73) Assignee: Simplefeed, Inc., Los Altos, CA (US)

( * ) Notice: Subject to any disclaimer, the term of this patent is extended or adjusted under 35 U.S.C. 154(b) by 1337 days.

(21) Appl. No.: 11/129,634

(22) Filed: May 13, 2005

(65) Prior Publication Data

US 2005/0267973 A1 Dec. 1, 2005

Related U.S. Application Data

(60) Provisional application No. 60/615,005, filed on Sep. 30, 2004, provisional application No. 60/572,174, filed on May 17, 2004.

(51) Int. Cl.
*G06F 15/16* (2006.01)
(52) U.S. Cl. .................................... 709/217; 709/224
(58) Field of Classification Search .................... 709/217
See application file for complete search history.

(56) References Cited

U.S. PATENT DOCUMENTS

| 6,330,592 | B1 | 12/2001 | Makuch et al. |
| 6,671,715 | B1 | 12/2003 | Langseth et al. |
| 6,766,362 | B1 * | 7/2004 | Miyasaka et al. ............. 709/219 |
| 7,013,325 | B1 | 3/2006 | Vivian et al. |
| 7,134,073 | B1 | 11/2006 | Fiedorowicz et al. |
| 7,568,148 | B1 | 7/2009 | Bharat et al. |
| 2002/0071593 | A1 | 6/2002 | Muratani |
| 2002/0091818 | A1 * | 7/2002 | Cascio et al. ................. 709/224 |
| 2003/0163300 | A1 | 8/2003 | Kasvand et al. |
| 2004/0068552 | A1 * | 4/2004 | Kotz et al. ..................... 709/218 |
| 2004/0181598 | A1 * | 9/2004 | Paya et al. ..................... 709/227 |
| 2004/0181753 | A1 | 9/2004 | Michaelides |
| 2004/0205467 | A1 | 10/2004 | Kofman et al. |
| 2004/0225749 | A1 | 11/2004 | Pavlik et al. |

(Continued)

FOREIGN PATENT DOCUMENTS

WO    WO 03/067469 A2    8/2003

OTHER PUBLICATIONS

Frenchman, E., "RSS: What's in it for Marketers? (Part 2)," MarketingProfs.com, May 23, 2006, 1 page.

(Continued)

*Primary Examiner* — Ajay Bhatia
*Assistant Examiner* — Bryan Lee
(74) *Attorney, Agent, or Firm* — Fenwick & West LLP

(57) ABSTRACT

A system and a method to provide a personalized feed to a user. Information regarding the user is obtained from the user via customization content. The customization content indicates various categories of content for the user to select from. In response to the user selecting his or her categories of interest, a feed personalization module selects content pieces whose associated categories match the user selected categories. The feed personalization module then provides a personalized feed including these content pieces to the user. The personalized feed is provided to the user via a unique identifier assigned to the user. Using the unique identifier, the user's actions with respect to the provided feed is tracked. The feed is further re-personalized according to the user's actions. The feed is also re-personalized based on an input from the user indicating the relevance of the feed to the user's interests.

42 Claims, 22 Drawing Sheets

U.S. PATENT DOCUMENTS

| | | | |
|---|---|---|---|
| 2004/0254939 | A1 | 12/2004 | Dettinger et al. |
| 2005/0027741 | A1 | 2/2005 | Eichstaedt et al. |
| 2005/0165615 | A1 | 7/2005 | Minar |
| 2005/0243862 | A1* | 11/2005 | Krishnan ............ 370/468 |
| 2006/0167749 | A1 | 7/2006 | Pitkow et al. |
| 2006/0168622 | A1 | 7/2006 | Poll et al. |
| 2006/0173985 | A1 | 8/2006 | Moore |
| 2006/0230021 | A1* | 10/2006 | Diab et al. ............ 707/3 |
| 2009/0037388 | A1* | 2/2009 | Cooper et al. ............ 707/3 |

OTHER PUBLICATIONS

Heck, M., "SimpleFeed Turns RSS into Client Relationship Tool," InfoWorld, Feb. 17, 2006, 2 pages.

Malykhina, E., "Turn RSS Into Really Simple Sales," InformationWeek, Apr. 3, 2006, 1 page.

Needleman, R., "RSS: Beyond the Blog," Fresh Produce, Release 1.0, Jan. 11, 2005, 3 pages.

Ulanoff, L., "'Goodbye' RSS," PCMag.com, Nov. 30, 2005, 1 page.

Utter, D. A., "SimpleFeed Secures RSS Feed Publishing," webpronews.com, Feb. 7, 2006, 1 page.

Bray, Tim et al., "Extensible Markup Language (XML) 1.0", Feb. 10, 1998, 39 pages, [online] Retrieved from the Internet <URL:http://www.w3.org/TR/1998/REC-xml-1998021 0>.

Clark, James, "XSL Transformations (XSLT)", Nov. 16, 1999, 102 pages, [online] Retrieved from the Internet <URL:http://www.w3.org/TR/xslt>.

"Command-Line Utility", Feb. 7, 2001, 2 pages, [online] Retrieved from the Internet <URL:http://web.archive.org/web/2001_0207201608/http://xml.apache.org/xalan-j/commandline.html>.

Miller, Libby, "RSS, xhtml and XSLT", Jul. 4, 2002, 3 pages, [online] Retrieved from the Internet <URL:http://www.w3.org/2001/sw/Europe/200207/rascal/xslt-rss-events.html>.

Beal, B., "Are RSS Feeds the Next Great Marketing Tool?" CRM News, SearchCRM.com, Oct. 19, 2004, 5 pages, [online] Retrieved from the Internet <URL:http://searchcrm.techtarget.com/originalContent/0,289142,sid11_gci1017317,00.html>.

Grossnickle, J. et al., "RSS—Crossing into the Mainstream," White Paper, 2004, Yahoo!

PCT International Search Report and Written Opinion, PCT/US05/17194, Oct. 18, 2006, 6 pages.

Pilgrim, M., "What is RSS," XML.com, Dec. 18, 2002, 9 pages, O'Reilly Media, Inc., [online] Retrieved from the Internet <URL:http://xml.com/lpt/a/1080>.

Woodman, M., "Putting RSS to Work: Immediate Action Feeds," XML.com, Dec. 14, 2005, 6 pages, O'Reilly Media, Inc., [online] Retrieved from the Internet <URL:http://www.xml.com/lpt/a/1635>.

U.S. Office Action, U.S. Appl. No. 11/340,942, Mar. 8, 2010, 27 pages.

U.S. Office Action, U.S. Appl. No. 11/340,942, Aug. 20, 2009, 26 pages.

Miller, E. et al., "W3C RSS 1.0 News Feed Creation How-To," Jan. 24, 2001, [online] Retrieved from the Internet<URL:http://www.w3.org/2001/10/glance/doc/howto>.

"RDF Site Summary (RSS) 1.0," Dec. 6, 2000, [online] Retrieved from the Internet<URL:http://web.resource.org/rss/1.0/>.

"RSS :: Creating Feeds," Bitwise Magazine, Aug. 2005, Dark Neon Ltd., [online] Retrieved from the Internet<URL:http://www.bitwisemag.com/copy/reviews/software/internet/rss/feedge...>.

United States Office Action, U.S. Appl. No. 11/340,942, Jul. 25, 2008, 17 pages.

United States Office Action, U.S. Appl. No. 11/340,942, Mar. 13, 2009, 25 pages.

United States Office Action, U.S. Appl. No. 11/340,942, Aug. 29, 2011, 26 pages.

* cited by examiner

100

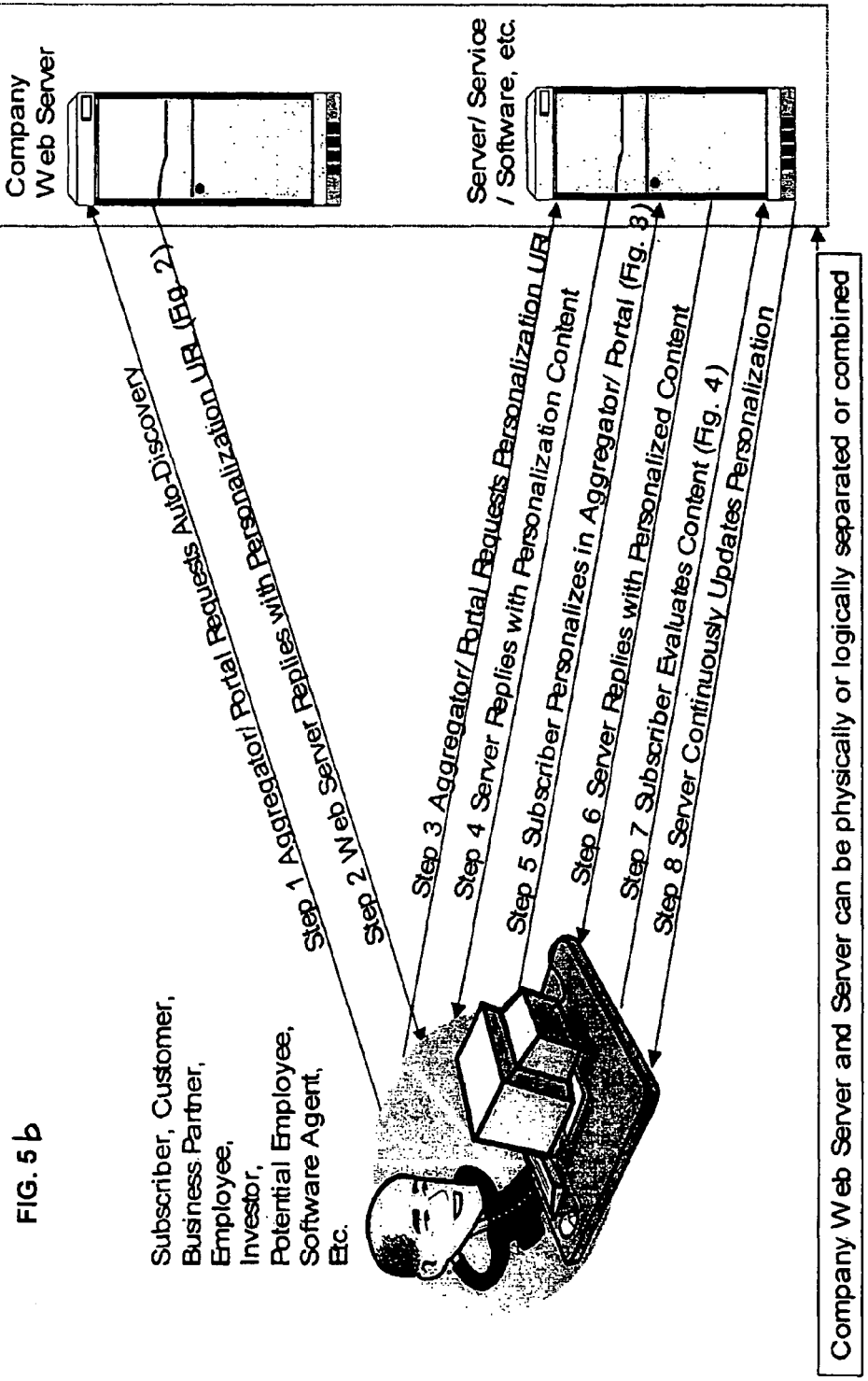

FIG. 6

```
<!DOCTYPE HTML PUBLIC "-//W3C//DTD HTML 4.01 Transitional//EN"
"http://www.w3.org/TR/html4/loose.dtd">
<link rel="alternate" type="application/rss+xml" title="RSS"
href="customername.simplefeed.com.index.rdf" />
<html lang="en-us">
<head>
    <title>EAG united states - welcome</title>
    <meta http-equiv="Content-type" content="text/html; charset=ISO-8859-1">
    <meta http-equiv="Content-Style-Type" content="text/css">
    <meta name="eag_design_version" content="eagweb.1.2">
    <meta name="target_country" content="us">
    <meta name="web_section_id" content="R163">
    <meta name="page_content" content="all">
    <meta name="segment" content="any">
    <meta name="user_type" content="any">
    <!-- <meta name="product_service_name" content="ENTER_PRODUCT_SPECIFICATION"> 
    <meta name="lifecycle" content="ENTER_LIFECYCLE"> -->
    <meta name="generator" content="Globalsight (4.x)">
    <meta name="keywords" content="EAG, Enterprise, Automation, Group,
presario, evo, prosignia, deskpro, armada, ipaq">
    <meta name="Description" content="Making technology work.">
<script type="text/javascript" language="javascript">
<!--
    document.write('<style type="text/css">.color333333bg
{background-color:#333333;}</style>');
//-->
</script>
<!-- delete random js for static page -->

<script type="text/javascript" language="javascript">
    var CORP = 0;
    var HHO = 1;
    var SMB = 2;
    var ENT = 3;
    var seg_choices = new Array(CORP, HHO, SMB, ENT);
    //var cycle = seg_choices[Math.floor(Math.random() * seg_choices.length)];
    var cycle=3;
    var src_b1 = new Array();
```

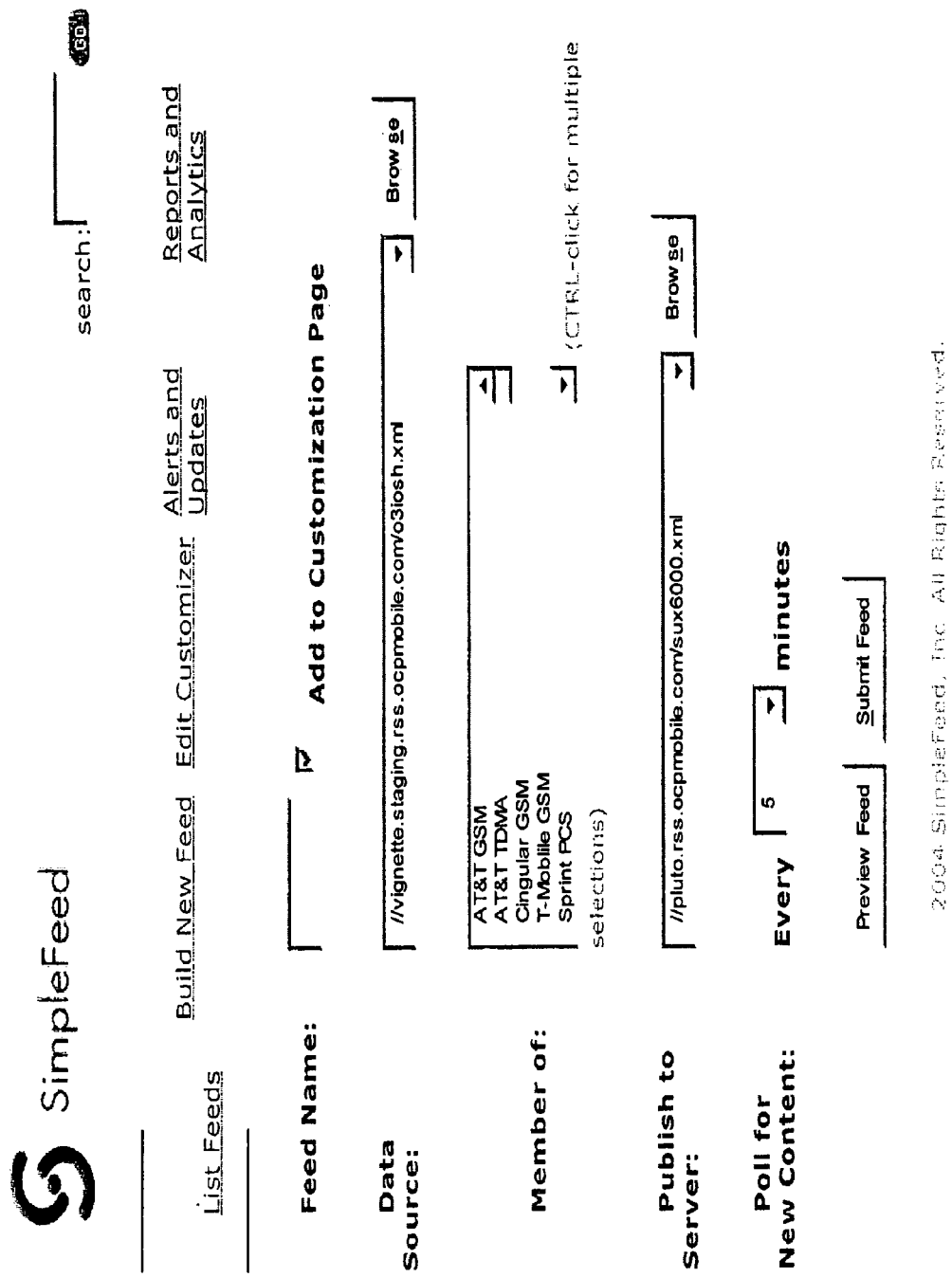

FIG. 12b

Edit Article

| | |
|---|---|
| TITLE: | EAG Sets Goal to Recycle 1 Billion Pounds |
| AUTHOR: | EAG, Inc. |
| URL: | http://www.eag.com/pr.71404 |
| DAYS PUBLISHED: | 1 |
| INSERTION DATE: | 11/07/2004 21:01 |
| DESCRIPTION: | EAG today announced it is accelerating its product recycling program by setting a goal to recycle 1 billion pounds of electronic products and printing supplies globally by 2007. |
| CONTENT: | C:\Documents and Settings\Desktop\EAG R [Browse...] |
| SIMPLE TAGS: | ☑ Components<br>☐ Construction<br>☐ Developers<br>☐ ESX Software<br>☑ Education<br>☐ Energy<br>☐ Events<br>☐ Financial Services |

FIG. 13

Look and Feel: [ OCP Mobile ▼ ]

Feed Name: [_____] Add? Data Source: [ //vignette.staging.rss.ocpmobile.com/o3iosh.xml ▼ ] Browse Feed Name: [_____] Add? Data Source: [ //vignette.staging.rss.ocpmobile.com/o3iosh.xml ▼ ] Browse Feed Name: [_____] Add? Data Source: [ //vignette.staging.rss.ocpmobile.com/o3iosh.xml ▼ ] Browse Feed Name: [_____] Add? Data Source: [ //vignette.staging.rss.ocpmobile.com/o3iosh.xml ▼ ] Browse Feed Name: [_____] Add? Data Source: [ //vignette.staging.rss.ocpmobile.com/o3iosh.xml ▼ ] Browse Feed Name: [_____] Add? Data Source: [ //vignette.staging.rss.ocpmobile.com/o3iosh.xml ▼ ] Browse Feed Name: [_____] Add? Data Source: [ //vignette.staging.rss.ocpmobile.com/o3iosh.xml ▼ ] Browse Feed Name: [_____] Add? Data Source: [ //vignette.staging.rss.ocpmobile.com/o3iosh.xml ▼ ] Browse Feed Name: [_____] Add? Data Source: [ //vignette.staging.rss.ocpmobile.com/o3iosh.xml ▼ ] Browse

[ Preview Feed ]  [ Add To Page ]

CUSTOMIZABLE AND MEASURABLE INFORMATION FEEDS FOR PERSONALIZED COMMUNICATION

CROSS REFERENCE TO RELATED APPLICATIONS

This application claims priority under 35 USC §119(e) to U.S. Provisional Patent Application No. 60/572,174, filed May 17, 2004, and titled "System and Method for Providing Customizable and Measurable Information Feeds to Constituents," and U.S. Provisional Patent Application No. 60/615,005, filed Sep. 30, 2004, and titled "System and Method for Providing Personalized XML Syndication Feeds in Conjunction with Auto-Discovery and Continuously Updating the Personalized XML Syndication Feeds for Each Subscriber," the contents of which are herein incorporated by reference.

BACKGROUND OF THE INVENTION

1. Field of the Invention

This invention relates generally to information distribution and more particularly to the distribution of customizable and measurable information feeds to users.

2. Description of the Related Arts

Many entities spend millions of dollars in communicating with their constituencies. These constituencies may represent current, past and potential customers, employees, shareholders, and business partners. However, it is a challenging task to effectively communicate with such constituencies. For example, it is difficult for a business to deliver the right marketing message to the right customer at the right time.

Typically, entities use telephone, face-to-face meetings, advertising, web sites, and e-mails to communicate with their constituencies. However, each of these methods has limitations. Telephone calls and face-to-face meetings are unable to reach a broad number of constituencies in a finite amount of time. Advertising may be poorly targeted and cost ineffective. Web sites may have difficulty getting repeat visitors. E-mails are facing limitations due to viruses, spam, customer resentment and apathy, and the lack of personalization. In addition, recent legislations such as the Controlling the Assault of Non-Solicited Pornography and Marketing Act of 2003 impose significant restrictions on entities in their use of e-mail correspondence.

Some entities try to overcome these limitations by using information syndication technologies such as rich site summary or really (or real) simple syndication ("RSS") and Atom, both of which are generally referred to as feeds. Feeds consist of information in a file with extensible markup language ("XML") tags and saving the file in a server such as a web server. Users can use client-side agents such as aggregators, portals, or browsers to monitor these files, understand changes to information (e.g., via the XML metadata), and download updates if appropriate. Feeds have many advantages over traditional communication methods, including cost effectiveness, potential higher user opt-ins (e.g., since an e-mail address is not necessary to subscribe to a feed), compliance with related laws and regulations, and presently, a lack of viruses and spam.

Nevertheless, feeds have many limitations, including the difficulty for non-technical people to create a feed, the lack of personalization, and the lack of a way to measure the effectiveness of feed communications. For example, early adopters of feed publishing have hundreds of feeds on their web sites. Thus, users are forced to guess and select which feeds are desirable to them. In addition, it is difficult for an entity to understand which feeds, if any, are effective in meeting its communication objectives, since there is not an available method to measure and analyze the effectiveness of feed communications. Furthermore, designing an effective feed is difficult since entities are communicating with a client-side agent to gain a user's attention. Such a client-side agent may become increasingly sophisticated and vital to an entity's objectives.

To address the problems of end-user usability, an auto-discovery technique was developed for a client-side agent to automatically discover the availability of feeds on a particular network location. In this auto-discovery technique, a user's client-side agent searches pages on a web site to look for a hypertext markup language ("HTML") tag that indicates support for feeds. The client-side agent then places a universal resource identifier ("URI") such as a uniform resource locator ("URL") of the feed into the client-side agent to allow the user to subscribe to the feed. However, even though auto-discovery provides the ease of discovering feeds, it still lacks the ability to create personalized feeds.

In addition, entities and their constituencies' information needs change over time. For example, a business's products and services may be introduced, sold, supported, and ultimately removed from the market place. A customer's interest in a business' products and services may change based on competitors' pricing. As a result, the business may no longer have information to send to a particular customer via a feed, and the customer may find the feed less relevant to his or her interest. One solution is to insert content into the feed suggesting the customer to subscribe to a new feed. But requiring the customer to unsubscribe, visit a web site, and re-subscribe to a new feed is a hassle for the customer, which may eventually decrease feed subscriptions.

In addition, as feeds are delivered by means of a URL, such URLs can be discovered by software agents and/or shared with other users via a variety of methods such as OPML, search engine and directories. This presents problems for entities that wish to deliver personalized information via feeds and/or wish to measure feed use on a per subscriber basis. It also presents problems for subscribers who may get irrelevant content and/or who may intentionally or unintentionally customize another subscriber's feed.

Further, feeds are taxing on systems that serve the particular feeds due to automatic user agents polling the server continuously (at a preset interval) for information updates. This may cause either severe spikes in load for the servers or cause bandwidth spikes that would exceed thresholds and thus result in excessive charges. This problem may get worse as more real time data is placed in RSS Feeds and user agents increase the frequency of their requests. In addition, if systems are unavailable due to maintenance or failure, user agents typically return error messages, an unsatisfactory experience for users.

Therefore, in view of these shortcomings in the art, there is a need for (1) a technique that allows feed personalization in an auto-discovery environment, (2) feeds that provide continuous monitoring of feed use to enhance feed relevancy and personalization, (3) securing, authenticating and identifying feed publishers, feeds and feed subscribers, as well as (4) distributing the load and handling availability while maintaining an entities desired quality of service.

SUMMARY OF THE INVENTION

To address the above, the present invention includes a system and a method for providing a personalized feed to a user. In an embodiment of the invention, information regarding the user is obtained from a source. For example, a user profile module may obtain the information regarding the user via customization content provided to the user. The customization content indicates various categories of content from which a user may make a selection. In response to the user selecting his or her categories of interest, a feed personalization module selects content pieces whose associated categories match the user selected categories. The feed personalization module then provides a personalized feed including these content pieces to the user.

In another embodiment of the invention, the system and method of the present invention assigns a unique identifier to the user and provides the personalized feed to the user via the unique identifier. The unique identifier can be any unique identifier, for example a unique URL, a cookie, a digital certificate, an IP address, a machine fingerprint, or a username and/or password. Using the unique identifier, the present invention is able to track the user's actions with respect to the provided feed. Thus, an embodiment of the invention further re-personalizes the feed according to the user's actions. Another embodiment of the invention requests an input from the user regarding the relevance of the feed to the user's interests. Based on the input from the user, the feed may further be re-personalized to provide relevant content to the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. ("FIG.") 1 illustrates one embodiment of a system for providing a personalized feed to a user in accordance with the present invention.

FIG. 5b illustrates one embodiment of an exemplary flow chart for an entity to provide a personalized feed to a user in accordance with the present invention.

FIG. 6 illustrates one embodiment of an exemplary HTML document with the appropriate HTML tag that indicates the support of auto-discovery in accordance with the present invention.

FIGS. 12a and 12b illustrate one embodiment of the screenshot of an exemplary web page that allows a publisher to create, categorize, and publish a feed in accordance with the present invention.

FIG. 13 illustrates one embodiment of the screenshot of an exemplary web page that allows a publisher to specify the data source of a feed and to customize the feed's format in accordance with the present invention.

FIG. 16 illustrates one embodiment of the screenshot of an exemplary web page that supports personalized feeds in accordance with the present invention.

FIG. 17 illustrates one embodiment of the screenshot of an exemplary web page that displays an XML icon indicating the availability of feeds in accordance with an embodiment of the present invention.

FIG. 18 illustrates one embodiment of the screenshot of an exemplary web page displaying customization content in accordance with the present invention.

Figure 20:
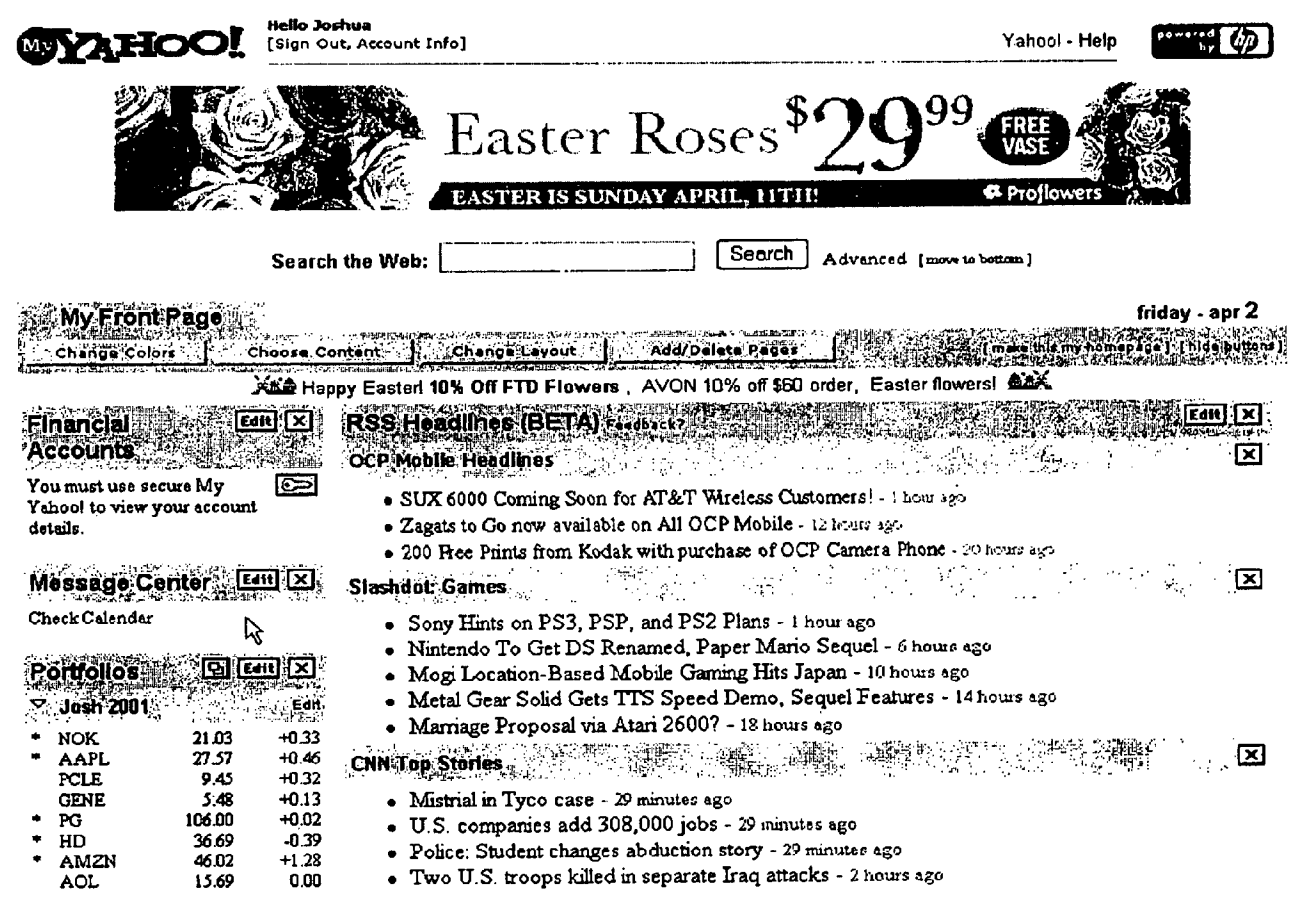

FIG. 20 illustrates one embodiment of the screenshot of an exemplary third-party web page to which personalized feed content has been added in accordance with the invention.

DETAILED DESCRIPTION OF THE PREFERRED EMBODIMENTS

Figure 1:
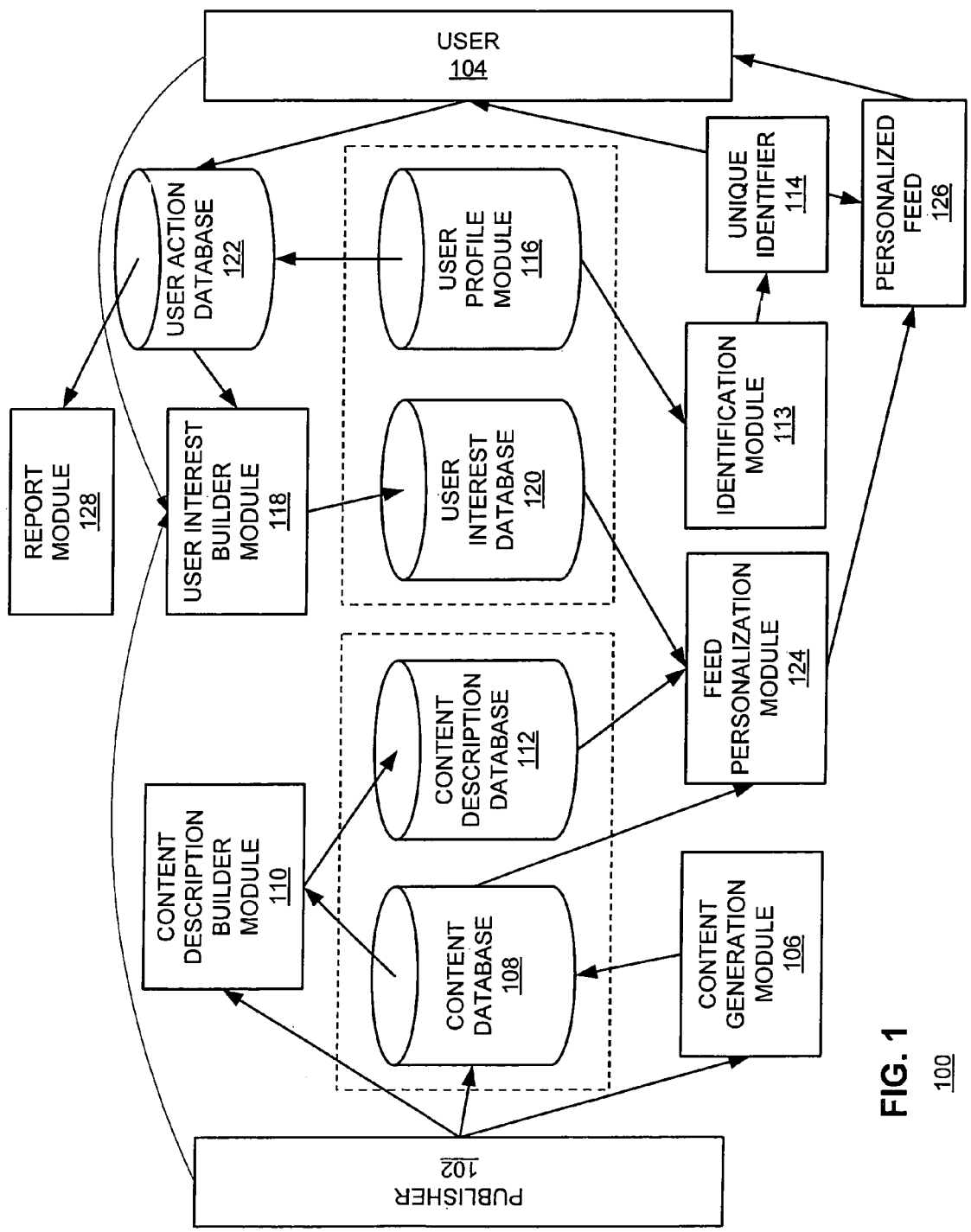

The Figures ("FIG.") and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

The present invention includes a system and a method for providing a personalized feed to a user. Feeds are created by putting information into a file with extensible markup language ("XML") tags and dynamically generating or saving the file in a server such as a web server. Users can use client-side agents such as aggregators, portals, or browsers to monitor these files, understand changes to information (e.g., via the XML metadata), and download updates if appropriate. In one embodiment, customization content is provided to the user for the user to define categories of content that are of interest to the user. Alternatively, the user can define other parameters, for example, keywords, limits, ranges, or the like. In addition, a unique identifier is provided to the user for directing the user's client-side agent (e.g., an aggregator, browser, or portal) to feeds personalized based on the defined categories. The unique identifier also allows a feed publisher to track the effectiveness of the feeds provided to the user.

Additionally, the system collects user inputs with regard to the provided feeds. The system is adapted to continuously re-personalize feeds based on the collected user inputs in order to provide relevant and desirable content to the user. The personalized feeds may be used for product marketing, sales, customer support, training, recruiting, investor relations, business partner relations, product development, internal corporate communications, etc.

One skilled in the art will readily recognize from the following description that alternative embodiments of the structures and methods illustrated herein may be employed without departing from the principles of the invention described herein.

FIG. ("FIG.") 1 illustrates a system 100 for providing personalized feeds to a user in accordance with an embodiment of the present invention. The system 100 is a server-based application with which entities and their constituencies interact via an agent such as a web browser or another server or other software. The system 100 can be located at any location in a network, for example, in an entity's premise, offsite on a global communications network such as the Internet, or a distributed environment (e.g., part within an entity's premise and part on the Internet).

A publisher 102 (e.g., an entity's employee) creates feeds using the system 100. The publisher 102 can log on to the system 100 following authenticating himself or herself, for example, using a user identifier and/or password. In response to successfully authenticating the publisher 102, the system 100 generates a user interface such a web page for the publisher 102 to create new feeds, view and edit existing feeds, review alerts and updates concerning the system 100, and perform reporting and analysis on the effectiveness of feed communications.

The system 100 allows a non-technical publisher to create, categorize, and publish feeds. According to an embodiment of the invention, to create personalized feeds, the publisher 102 first creates new content. For example, the publisher 102 can use the user interface provided by the system 100 to navigate a network (e.g., the Internet or intranet) to find the location of the data file or files to be provided to a user 104 as a feed. The user 104 may be a human or a machine such as a business process, a software agent, a search engine, etc. If the data files do not include the XML tags necessary for creating a feed, a content generation module 106 is adapted to convert the files into a readable feed by adding the necessary XML tags.

The publisher 102 can also create text or other content (e.g., copying from a content creation software program) in a browser-based text box of the user interface and/or upload discrete data files and attachments or enclosures for the content generation module 106 to create the necessary XML tagged data file. The content generation module 106 further allows the publisher 102 to name a feed and decide if the feed content can be personalized. The publisher 102 can use the user interface to find and decide on a network location to publish the feed and to specify how often to check for changes to the feed content.

The user interface further allows the publisher 102 to preview the feed and examine the XML tagged file before deciding to publish the feed. If the publisher 102 decides to publish the feed, a content database 108 is adapted to store the XML tagged data file (including its content and the related information such as the location where the feed is published) created by the publisher 102 manually or via the content generation. module 106.

The system 100 further allows the publisher 102 to create relations between a given piece of content and one or more categories to assign the categories to the piece of content for personalization purposes. In an embodiment of the invention, a content description builder module 110 builds the content description for each piece of content. The content description is then stored in a content description database 112. The content description builder module 10 can build the content description for a piece of content by receiving inputs from the publisher 102 directly, by analyzing the content piece automatically, or by some other methods. For example, the publisher 102 may define a set of categories that various contents may be related to.

The content description thus comprises a list of categories that apply to the particular piece of content. Hence, the content description builder module 10 can build the content description for a content piece by receiving a complete list of categories from the publisher 102 and receiving inputs from the publisher 102 specifying the categories that are applicable to the particular content piece. Alternatively, the content description builder module 110 can build the content description by performing textual analysis on the content piece to derive the applicable categories for the content piece.

Figure 2:
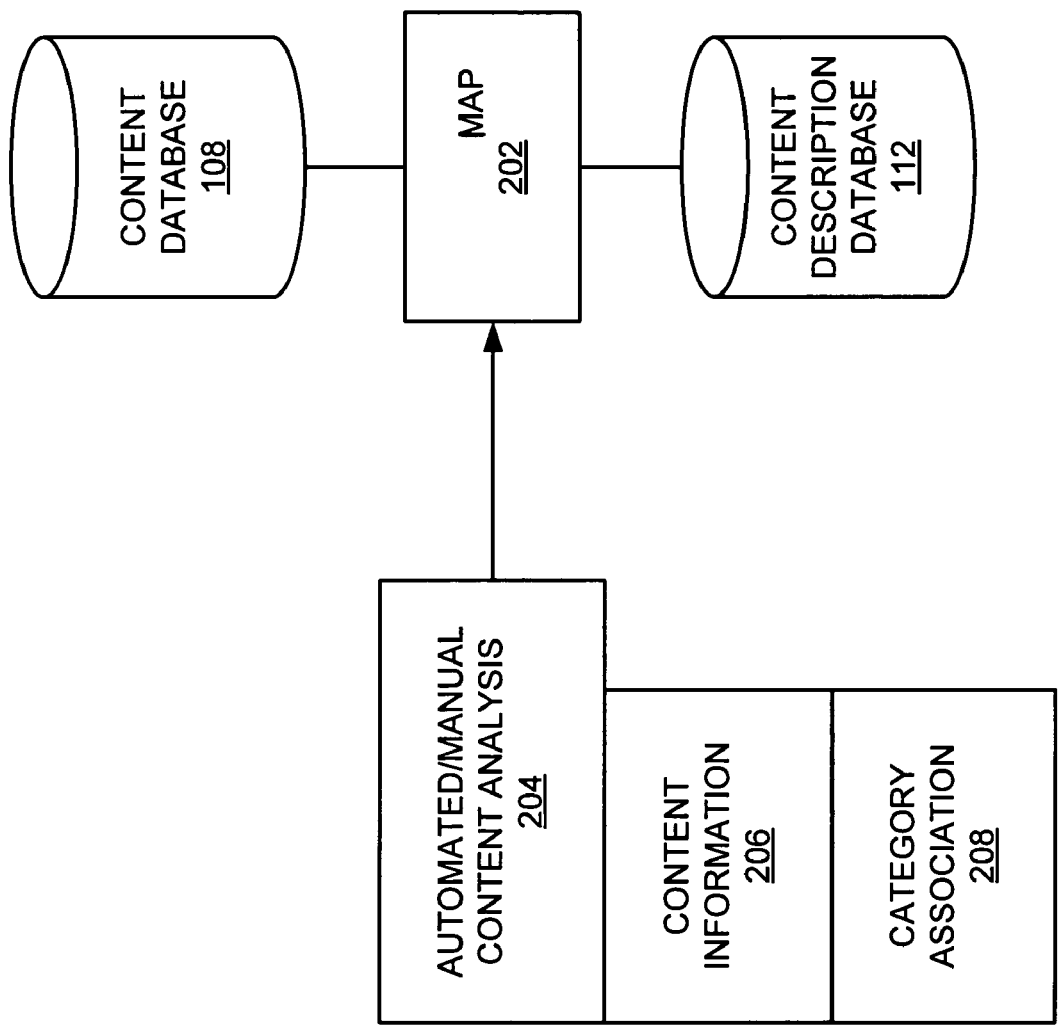
FIG. 2 illustrates one embodiment of an architecture for mapping content descriptions to content pieces in accordance with the present invention.

FIG. 2 illustrates an architecture for mapping content descriptions stored in the content description database 112 to pieces of contents stored in the content database 108, according to an embodiment of the invention. As shown in FIG. 2, the content description builder module 110 is adapted to build a static map 202 to associate each content piece stored in the content database 108 to one or more content descriptions (e.g., categories) stored in the content description database 112. In particular, the content description builder module 110 analyzes 204 each content piece stored in the content database 108 either manually (e.g., by receiving inputs from the publisher 102) or automatically (e.g., by using textual analysis). The static map can be rebuilt at predefined times and/or based on internal or external event triggers.

Mapping content descriptions stored in the content description database 112 to pieces of contents stored in the content database 108 can also be done dynamically. Dynamic mapping can be affected by various factors including explicit user input, information provided by third party systems, information stored in system 100 (such as reporting/statistics, other content items), and runtime characteristics (both of the user agent and of the system 100). Dynamic mapping based on system reporting/usage (e.g. "most popular" category that gets mapped to the piece of content that was clicked the most number of times). In one embodiment, dynamic mapping can be based on relative scoring compared to other content (for example article length). In another embodiment, dynamic mapping can be based on external data. In another embodiment dynamic mapping could be based on temporal factors (for example, "last updated", "newest", "today"). In another embodiment, dynamic mapping can be based on aggregators' runtime characteristics (e.g. "most popular" for the region of the world where the client is located).

From the analysis, the content description builder module 110 generates content information 206 for each piece of content analyzed as well as a category association 208 for the analyzed content piece. The category association 208 specifies one or more categories associated with the given content information 206. The category association 208 and the content information 206 is then stored in a database as a map 202 between the content database 108 and the content description database 112.

Referring back to FIG. 1, after the user 104 creates a new user account on the system 100, an identification module 113 assigns the user 104 a unique identifier 114, which can be a mnemonic. According to an embodiment of the invention, the unique identifier 114 may be a unique URL, cookie (or other client side storage), Internet protocol ("IP") address, machine fingerprinting (e.g., a unique property or identifier of a piece of hardware or software such as a unique software installation), digital certificate, username and/or password or other tracking methods that uniquely identify the user 104. The mnemonic identifier may be based on any of the above tracking methods or assigned from other systems. The unique identifier 114, e.g., a mnemonic identifier, for the user 104 is stored in a user profile module 116 that obtains and stores profile information regarding the user 104.

Also shown in FIG. 1, a user interest builder module 118 is configured to continuously build and update interests of the user 104 by directly receiving inputs from the user 104, analyzing actions of the user 104, accessing the profile of the user 104 in other systems (e.g., the internal customer relationship management ("CRM") of the publisher 102), or some other methods. For example, user interests may comprise a list of categories (or other parameters, e.g., such as keywords or ranges) that the user 104 has explicitly or implicitly indicated to be of interest to him or her. Thus, the user interest builder module 118 may identify the user interests of the user 104 by asking the user 104 (e.g., in response to the user 104 creating an account with the system 100 or re-personalizing an existing feed) to select categories of interest out of the categories stored in the content description database 112. The user interests for the user 104 are stored in a user interest database 120.

The user interest builder module 118 can also build the user interest database 120 using the actions of the user 104. Actions of the user 104 are tracked (e.g., via the unique identifier 114 and server redirects) and stored in a user action database 122, which is linked from the record of the user 104 stored in the user profile module 116. The user actions may represent behaviors of the user 104 (e.g., based on past user activities relative to a document, a feed, a web site or the system 100, or any information regarding the user 104 such as purchase history). The user actions may also be derived from analysis of external data (e.g., obtained from third party web sites, agencies, or other entities) regarding the user 104 as well as statistical information with regard to the feed use of the user 104.

A feed personalization module 124 generates feeds out of the contents stored in the content database 108. In particular, the feed personalization module 124 is adapted to take the list of categories out of the user interests stored in the user interest database 120 and compare them to the categories stored in the content description database 112 to determine which pieces of contents are relevant to the user 104. By referring to the map 202, the feed personalization module 124 selects the content pieces whose assigned categories match the user interests for creating a personalized feed 126. The system 100 then inserts certain user identifiable information (e.g., a user name or company name) and tracking methods such as cookies and GIFs. The system replaces embedded URLs with re-direct URLs and provides the personalized feed 126 to the user 104 when requested by a client-side agent such as an aggregator, portal, or browser or by a software agent running on a server.

In one embodiment, the system 100 serves the personalized feed 126 to the user 104 via the unique identifier 114 to enable further user action tracking. The unique identifier 114 tracks future actions of the user 104. The user actions are stored in the user action database 122 for the user interest builder module 118 to continuously update the user interest database 120. Thus, the feed personalization module 124 can continuously provide relevant, personalized feeds to the user 104 based on various user actions.

The content of the personalized feed 126 may be in any number of views (e.g. complete or summary form), based on information regarding the user 104 that is stored in the user profile module 116, and/or run-time information (e.g., server and/or client), and/or based on the company's business rules. For example, if the user 104 is a subscriber to a particular publication, the feed personalization module 124 may provide the entire content of the publication's article in the feed 126 provided to the user 104. But if the user 104 is not a subscriber to the publication, the feed personalization module 124 may provide a summary description of the article in the feed 126 provided to the user 104.

To further personalize the feed, the system 100 can insert mnemonic identifiers in the feed URL and/or in various places in the Feed, such as the title and the content text. The mnemonic identifiers can come from subscriber input or unique identifiers or from company sources such as database records located in other systems. Such mnemonic identifiers have the benefit of insuring subscribers are using feeds which are personalized for them.

In an embodiment of the invention, the user 104 is able to specify the categories of interest directly to the user interest builder module 118 via customization content provided by the publisher 102 (e.g., a customization web page or a customization feed). In particular, the user interface provided by the system 100 allows the publisher 102 to select a method to be used by the user 104 to specify the categories of interest. Such a method may include checkboxes, keywords, categorization, navigating to an appropriate section of a web page to personalize information, etc. The publisher 102 can choose to publish the customization content in a variety of "look and feel" options. The publisher 102 can further preview and examine the customization content before providing it to the user 104.

The publisher 102 may examine the feed use to determine if the feed 126 has met its objectives. Via a report module 128, the publisher 102 can access a "report and analysis" user interface provided by the system 100. Within the "report and analysis" user interface, the publisher 102 can run a variety of preconfigured reports or download data in a variety of formats (e.g., XML, spreadsheet, word processor, comma separated values, etc.) to analyze the feed use. For example, to generate a preconfigured report, the publisher 102 can choose one or more feeds, a beginning and ending date range, and the type of report to be included (e.g., the number of subscribers, the growth in subscription, feed read rates, feed open rates, click through by the subscribers, revenue from the feed, relations to various cost parameters such as bandwidth and relative benchmarks of similar feeds, etc.).

The user interface also allows the publisher 102 to generate and view graphical representations of the data. Feed use data is stored in a database of the system 100 (not shown) and derived from tracking users via unique identifiers such as URLs, embedded URL redirects, cookies, and integration with other corporate systems. The publisher 102 can analyze and generate reports on the feed use on a per user basis or as an aggregated group of users to determine if the feed communication has met its objectives.

Figure 3:
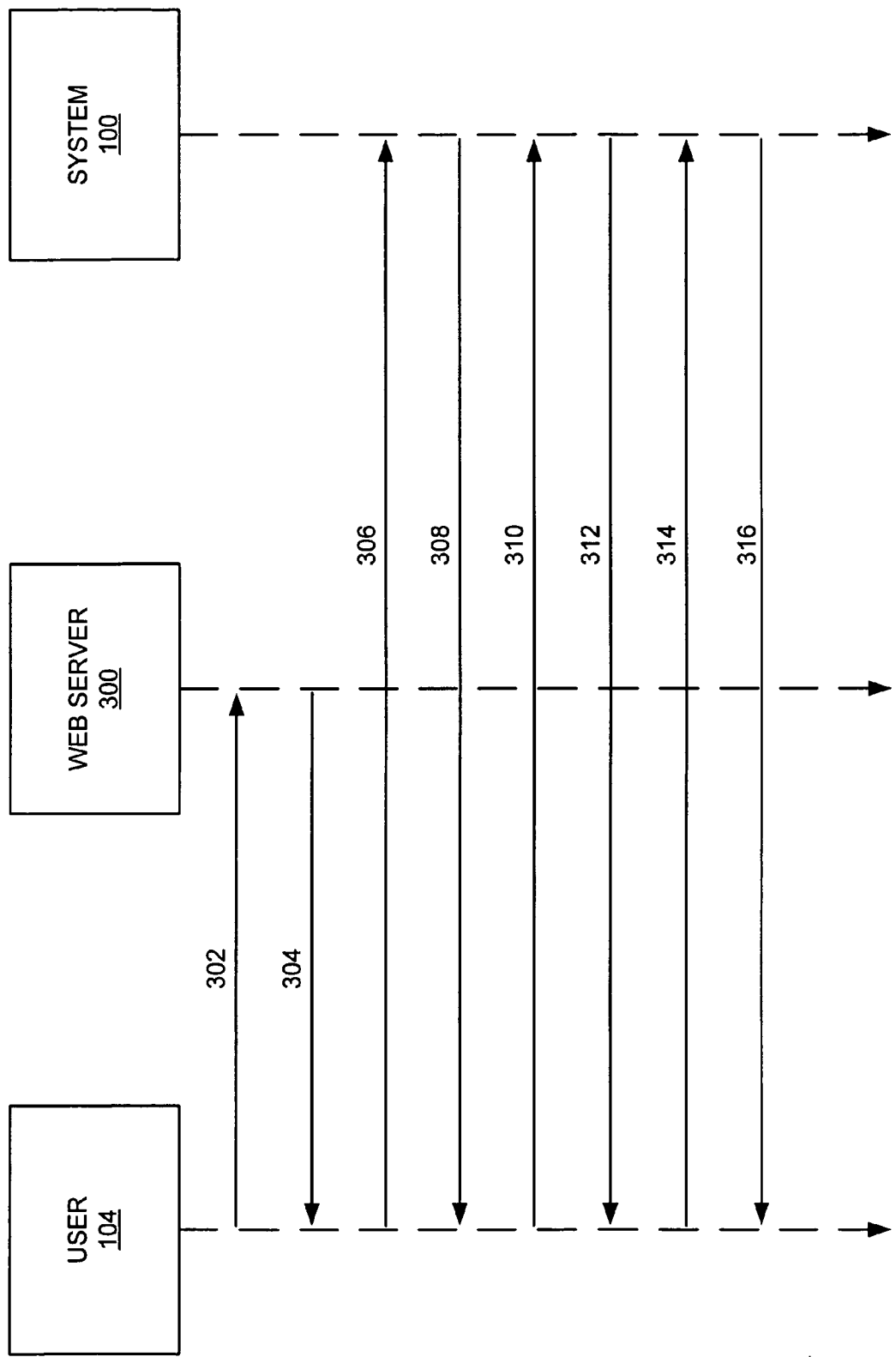
FIG. 3 illustrates one embodiment of a process for providing a personalized feed to a user in accordance with the present invention.

FIG. 3 illustrates a process for providing personalized feeds to a user according to an embodiment of the invention. The publisher 102 begins the process by inserting an appropriate HTML markup indicating the support for feed auto-discovery into a web page. When the user 104 performs 302 an auto-discovery of the web page, a web server 300 (which may reside on the same machine as the system 100) responds 304 to the user 104 with a feed URL.

The web server 300 may send to the user 104 a web page that includes a customization URL, which may be automatically inserted into the client-side agent of the user 104. In response to the user 104 requesting 306 the customization URL using the client-side agent, the system 100 sends 308 to the user 104 a customization feed that allows the user 104 to personalize future feed contents. The customization feed may include checkboxes, keywords, categorization, or navigation to allow the user 104 to select categories that are of interest to him or her. The customization feed may also include other contents than the customization content.

In an embodiment of the invention, instead of a customization feed, the system 100 provides a customization web page to the client-side agent. The customization web page includes customization contents that allow the user 104 to personalize feeds by choosing categories of interest. The system 100 may also respond with, or provide a location to get, the data type and description of the categories of interest. The client-side agent then either requests the categories of interest from the user 104 or automatically fills out the categories of interest based on data profiles of the user 104 stored in the client-side agent or information obtained from an external source.

In response to the user 104 requesting 306 the customization content, the system 100 may also obtain data regarding the user 104 (e.g., the IP address, aggregator type, browser type, etc.) from the client-side machine of the user 104. The system 100 is adapted to record the obtained data in the user profile module 116. The system 100 then dynamically builds customization content, translates the customization content into an appropriate format based on the information stored in the user profile module 116, and serves the appropriately formatted customization content to the user 104.

The user 104 accesses the customization content (e.g., via a customization feed or customization web page) using the client-side agent, personalizes future feeds by choosing categories of interest, and sends 310 the chosen categories back to the system 100. The system 100 then provides content (e.g., a web page, a file, etc.) including a unique identifier 114 (e.g., a unique URL) to the user 104 via the client-side agent. The user 104 can then use the unique identifier 114 to request personalized feeds. The system 100 then searches the user profile module 116 for a user record that matches the unique identifier 114.

Based on the user interests stored in the user interest database 120, the system 100 queries the content description database 112 for matching categories in order to find appropriate contents stored in the content database 108 to be provided to the user 104. The system 100 dynamically builds a content feed based on the user interests, translates the feed into appropriate feed format based on user information stored in the user profile module 116 and serves the appropriately formatted feed to the user 104 via the client-side agent. For example, the user 104 may cut and paste the unique URL into the client-side agent to obtain the personalized feeds. Alternatively, the system 100 may automatically insert the unique URL into the client-side agent without any user action.

In an alternative embodiment of the invention, if the user 104 requests the customization content from the system 100, the system 100 serves the client-side agent of the user 104 a cookie and adds the cookie's identifier to the user profile module 116. In response to the user 104 personalizing future feeds by choosing categories of interest, the system 100 reads the cookie residing on the client-side agent and serves the user 104 personalized feeds. Accordingly, the user 104 does not need to insert the unique URL into the client-side agent to obtain the personalized feeds.

Alternatively, the system 100 may authenticate the user 104 via a client-side digital certificate or a combination of user identifier and password. The client-side certificate or the user identifier and password may be stored in the client-side agent or other client resources, or may be requested from the user 104. Other authentication methods include security tokens, smart cards, etc. If the user 104 is successfully authenticated, the server 300 serves the personalized feeds to the user 104 via the client-side agent.

The personalized feeds provided to the user 104 can include encrypted information. Specifically, the content generation module 106 obtains content pieces from a source and tags the content pieces with machine-readable tags before storing them in the content database 108. The machine-readable tags alert an encryption module (not shown) to encrypt some or all of the data in the content pieces. The user information stored in the user profile module 116 also includes security attributes such as encryption keys, digital certificates, security tokens, user identifier, password, biometrics, etc.

In response to the user 104 requesting personalized feeds, the encryption module encrypts the content pieces stored in the content database 108 (if not already encrypted) using the security attributes of the user 104. The encrypted contents are then provided to the client-side agent as feeds via an encrypted or non-encrypted transport. The client-side agent then uses the appropriate security attributes to decipher the contents. Accordingly, the publisher 102 may use feeds to sell and distribute confidential and/or rights-protected information to the user 104.

The system 100 may also provide contents to the user 104 indirectly. For example, instead of directly providing contents to the user 104 within a feed, the feed may include a link to encrypted or unencrypted contents residing on the content database 108. By providing a link to the contents instead of directly providing the contents to the user 104, the user 104 is prevented from saving or transferring the contents. The system 100 may further record the decryption of contents by the user 104 in the user action database 122 for reporting and analysis purposes. Furthermore, communications between the user 104 and the system 100 may take place over encrypted communication channels such as a secure sockets layer ("SSL") or virtual private network.

In an embodiment, an authentication module (not shown) may establish a content creator's authenticity using a variety of methods such as digital signatures. Authenticated content is stored in the content database 108 and requested by the user 104. Based on the characteristics of the client-side agent, the system 100 serves a feed to the user 104 via a secure or insecure transport with contents that may be authenticated by one or more third parties. Thus, the client-side agent is able to verify if the original creator of the contents actually produced the contents, even if the contents are provided to the user 104 via one or more third parties.

The system 100 can track the user 104 via the unique identifier 114, for example, a unique URL, cookie, client-side certificate, IP address, user identifier and password, machine fingerprinting etc. Feed and web site usage are recorded in the user action database 112 (which may be flat file, relational, XML, etc.) and used for reporting and analysis purposes. In addition, the customization content may be provided to the client-side agent on a regular basis to encourage the user 104 to update the feed personalization. Alternatively, the customization content can be provided to certain users based on the customization rules of the publisher 102. For example, the customization content can be provided to users who have below average feed open rates or click through rates.

The system 100 is adapted to evaluate if a feed provided to the user 104 is relevant to the interests of the user 104. In particular, each feed provided to the user 104 is evaluated for relevancy through ways that are transparent to the user or through explicit user feedback. Based on these methods, the system 100 can provide feeds that are optimized for each user. Explicit user feedback may include responses to textual or graphical questions regarding the content relevancy (e.g., yes/no responses, numerical ratings, letter grade ratings, sliding scale of relevancy, etc.) and written comments. In an embodiment, the publisher 102 selects a feedback method that is inserted into a feed provided to the user 104. The user can review the feed, rank the relevancy of the feed, and provide 314 a feedback to the system 100. The user feedback is stored in the user action database 122 for reporting and analysis purposes and for intelligently determining categories that are of interest to the user 104. Based on the user feedback, the system 100 continuously updates 316 the feed contents to provide personalized feeds to the user 104.

An explicit user feedback is scored, normalized, weighted, and added to information collected from the user 104 transparently through server redirects, the unique URL, client-side certificate, user identifier and password, cookie, IP address, machine fingerprint, etc. Information collected transparently may include whether, when and/or how often the user 104 opened a feed, whether, when and/or how often the user 104 unsubscribed a feed or changed his or her personalization setting, whether, when and/or how often the user 104 clicked on a link in a feed and his or her actions during and after landing on the linked web site, as well as whether, when, and/or how often they recommend or forward this content to others. The combined data is compared with the data from other users and scored based on similarities and heuristic rules to determine trends and likely actions of the user 104. Based on historical trends of feed use, correlated actions by users and the heuristic rules, the system 100 develops experience rules and records the developed rules in the user action database 122.

If the user 104 requests personalized feeds, the system 100 queries the user action database for the appropriate record, and based on the experience rules, queries the content description database 112 for categories that match the experience of the user 104. The system 100 dynamically builds a feed including contents that are associated with the matching categories, translates the feed into an appropriate feed format based on information stored in the user profile module 116, and serves the personalized feed to the user 104 via the client-side agent. The system 100 can further send customization content to the user 104 for re-personalization by the user 104. The system 100 can thus adjust content inserted into the personalized feeds provided to the user 104 to encourage trends and actions desirable to the publisher 102.

Figure 4:
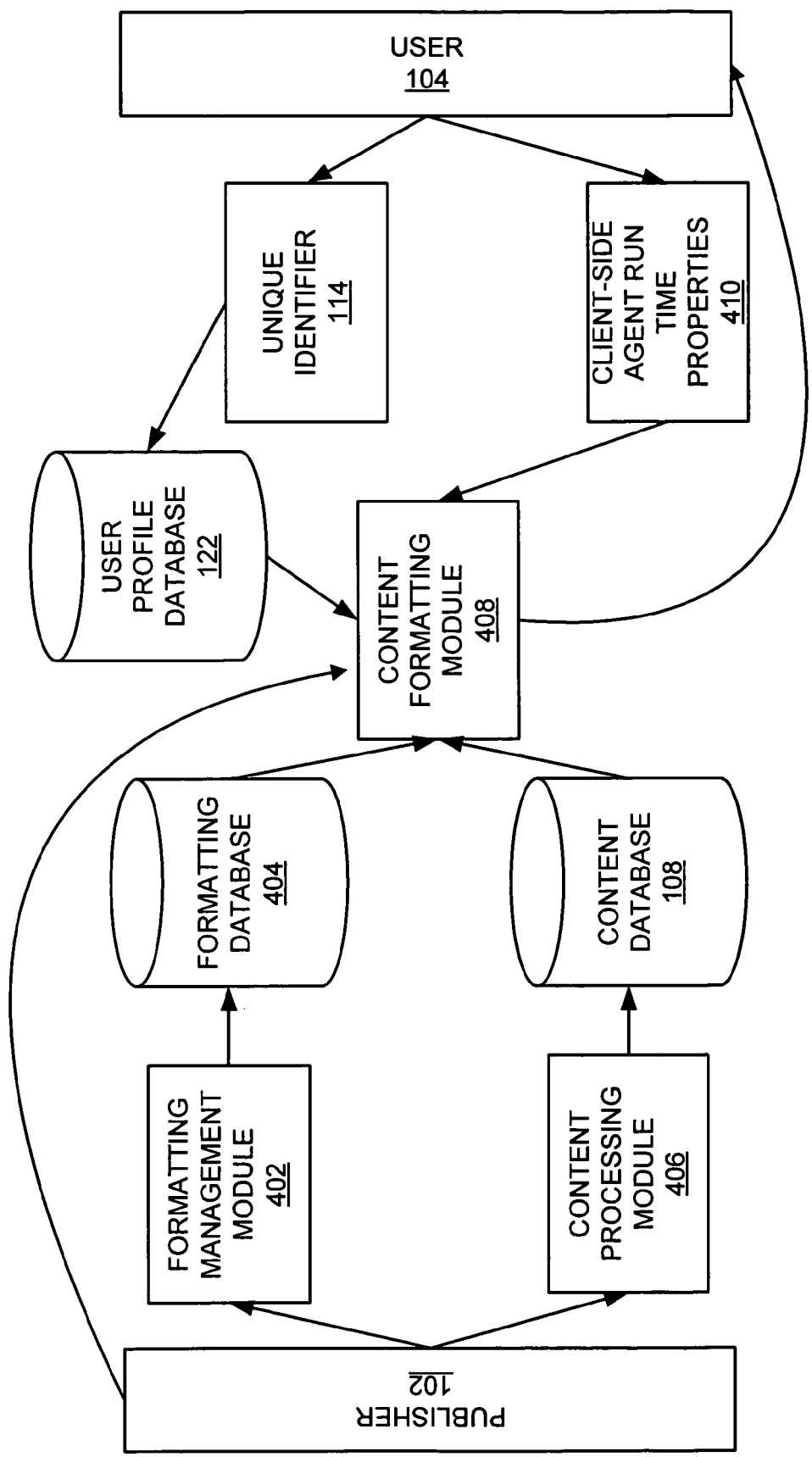
FIG. 4 illustrates one embodiment of an architecture for formatting feed contents to be provided to a user in accordance with the present invention.

FIG. 4 illustrates an architecture for formatting contents to be provided to the user 104 via personalized feeds in accordance with an embodiment of the invention. As shown, the publisher 102 manages a set of formatting templates via a formatting management module 402. The templates may include various styles and formatting, sections of content, as well associated workflow rules. The available templates are then stored in a formatting database 404. Based on the structure and/or formatting of a particular piece of content, a content processing module 406 parses the content piece and removes styles and formatting as necessary based on a set of data structure and format specific rules. For example, the content processing module 406 decomposes each content piece into various components. The processed content piece is then stored in the content database 108.

In response to the user 104 requesting a feed, a content formatting module 408 selects an optimal component of content stored in the content database 108 and an optimal formatting stored in the formatting database 404 based on a variety of factors. Such factors may include the user profile stored in the user profile module and user actions tracked via the unique identifier 144. The factors may also include runtime properties 410 of the client-side agent, such as the client-side agent's capabilities, database state, geographic location, authentication, encryption, rendering state, digital rights management ("DRM"), and other factors that may influence the optimal components and formatting.

The content formatting module 408 maps the content piece to appropriate fields in the templates stored in the formatting database 404. The content formatting module 408 decides which template applies to a piece of content automatically or manually based on the preferences of the publisher 102. The feed personalization module 124 then generates a feed with appropriately formatted content and provides it to the user 104. Thus, the system 100 is able to receive data that may be variously structured or formatted (e.g., dbase, word processing documents, HTML, XML, etc.) and output a feed whose appearance is consistent with an entity's style guidelines for a given type of communication. And the system 100 is able to provide content whose format or structure is appropriate for the client-side agent of the user 104.

The system 100 is able to deliver feeds at levels of service despite unpredictable requests from user agents. When the request for feed is received, system 100 checks its current usage level and/or bandwidth utilization and/or quality of service requirements and decides if the feed should be served immediately or if the feed serve should be delayed. If the answer is to delay, system 100 can communicate to the client its inability to respond with content (due to load or other conditions). In one embodiment of the system the system 100 sends back an HTTP redirect to the user agent (possibly after small delay) to come back to the server. This causes the user agent to (transparently) re-request the feed from the server again. This process can be repeated as many times as needed. Other methods include the creation of a specialized pre-arranged protocol between the system 100 and the user agent for retry or delay in streaming data back (e.g. send the data back slowly). To prevent a user agent from never getting a feed, a counter (e.g., in redirect URL, in the cookies, or stored in the server's internal table associated with each unique feed identifier). Once the timeout is exceeded, the feed would be returned immediately.

Figure 5A:
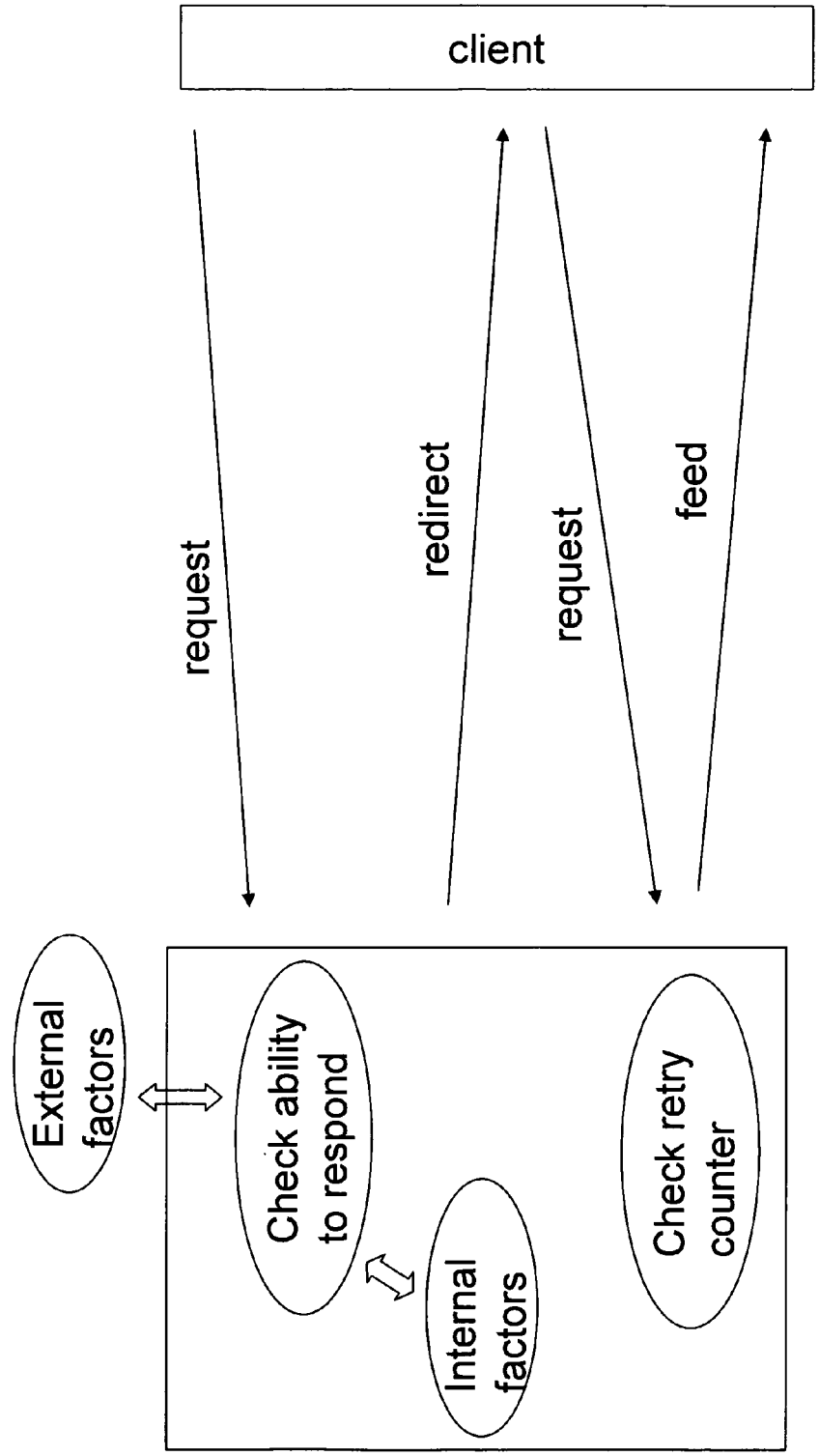
FIG. 5a illustrates one embodiment of handling load and availability of feeds in accordance with the present invention.

FIG. 5a illustrates one embodiment of an architecture for handling load and availability of feeds in accordance with the present invention. In particular, a client sends a request for a feed. The system 100, determines whether it has an ability to respond in view of internal factors, e.g., bandwidth or database availability, and external factors, e.g., times at which a particular feed may be made available. In view of this analysis, the system 100 can send back a response, e.g., a redirect, that may have the client continue trying to request the feed. The system 100 may track the number of attempts a client tries to obtain a feed using a counter. It is noted that the system can be configured to serve the feed within the bounds of the internal or external factors after a predetermined number of retries of the request from the client.

FIG. 5b illustrates an exemplary flow chart for a company to provide a personalized feed to a user such as a subscriber, customer, business partner, employee, investor, potential employee, software agent, etc. In step 1, a software agent such as an aggregator or a portal of the user sends a request for auto-discovery to the company's web server. In step 2, the company's web server replies with a personalization URL. In step 3, the software agent requests the personalization feed from the company's server, service, or software.

In step 4, the server, service, or software replies with customization content or personalization content. In step 5, the user personalizes his or her desired content at the software agent, and the software agent submits the desired content of the user to the server, service, or software. In step 6, the server, service, or software replies with personalized content or a URL for a personalized feed. In step 7, the user evaluates the replied content and provides the evaluation to the server, service, or software. And in step 8, the server, service, or software continuously updates the feed content according to the user's evaluation.

Figure 7:
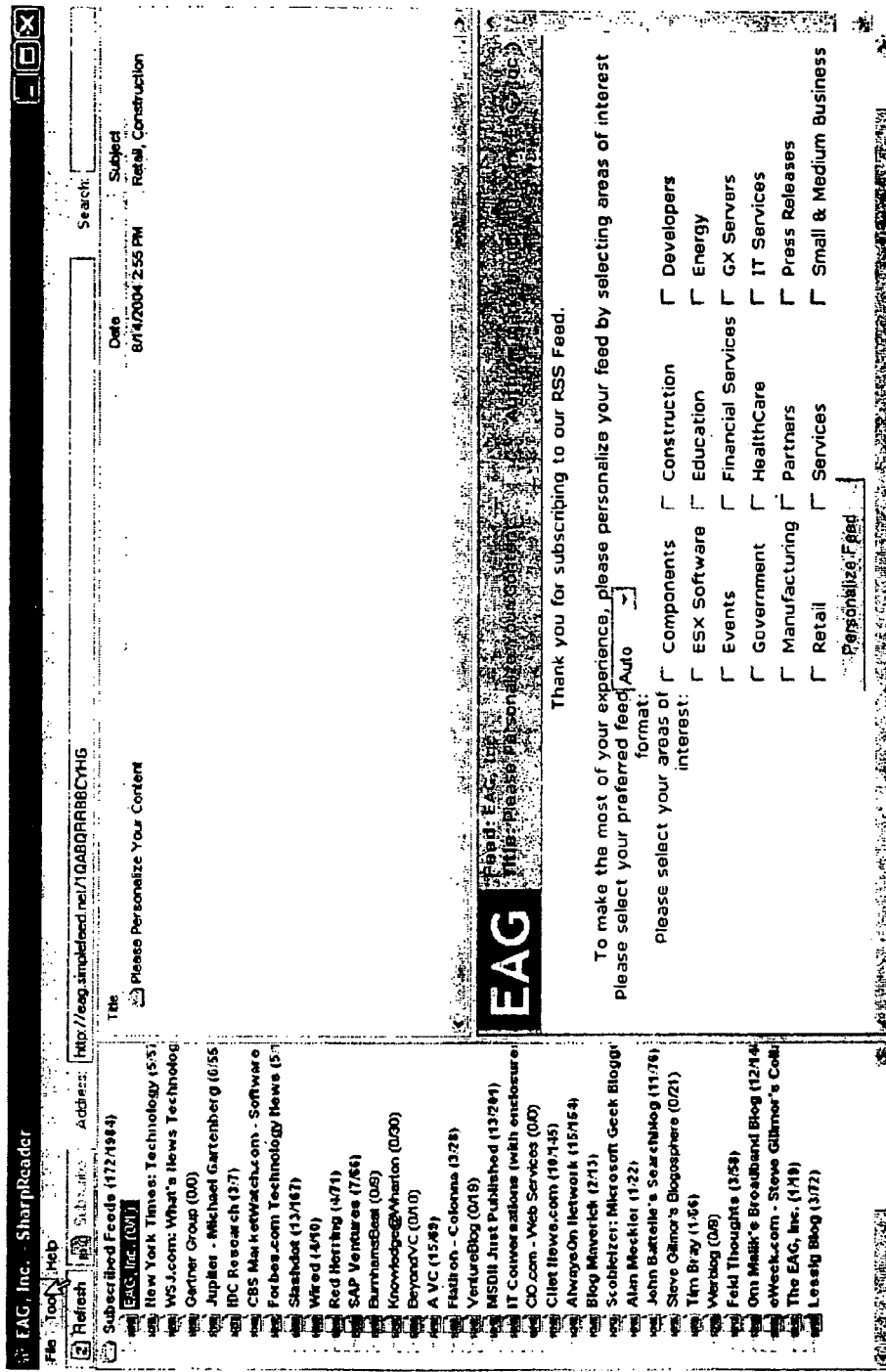
FIG. 7 illustrates one embodiment of the screenshot of exemplary customization content sent to a user via a feed in accordance with the present invention.
Figure 8:
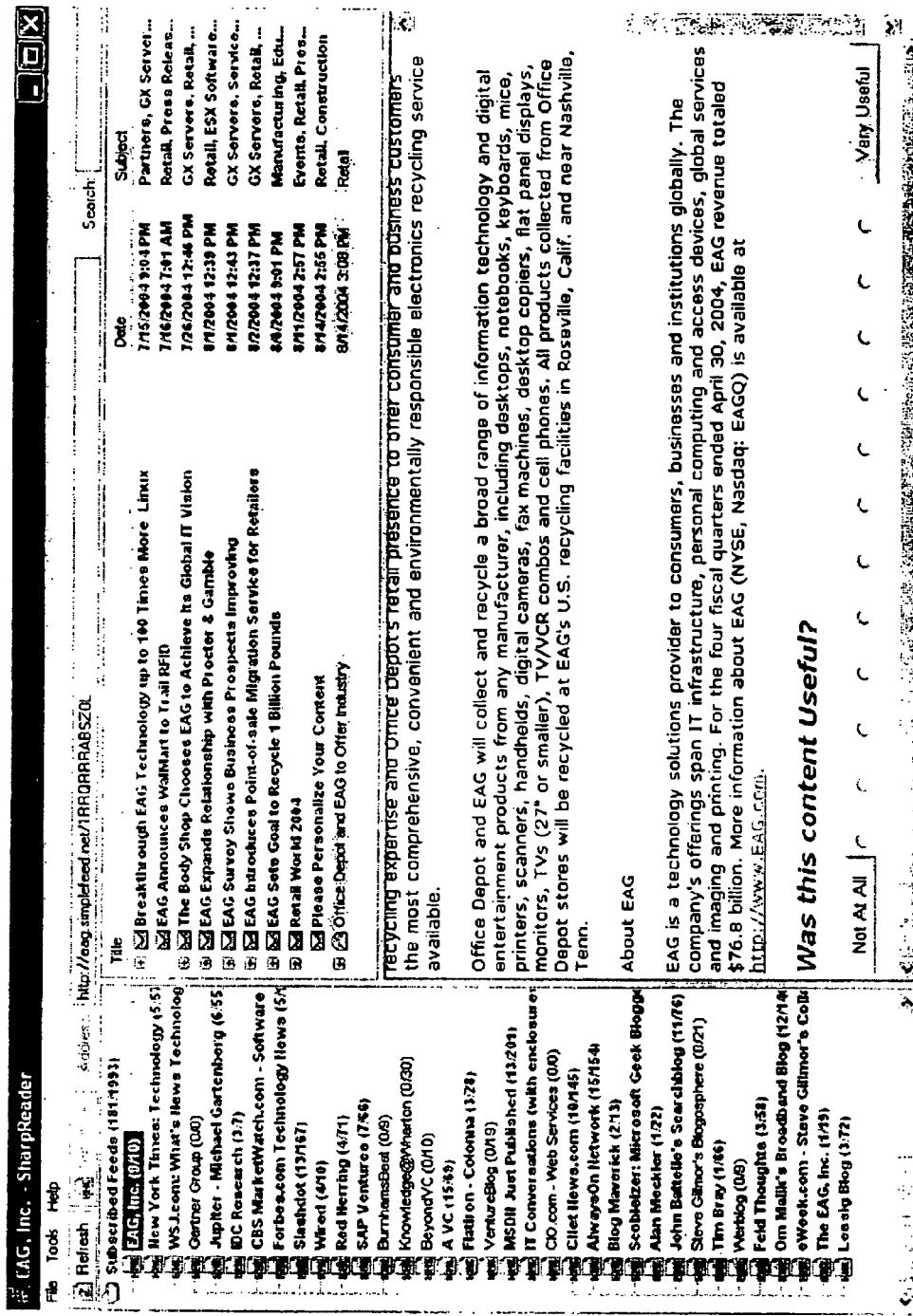
FIG. 8 illustrates one embodiment of the screenshot of an exemplary feed provided to a user that allows the user to rank the relevance of the feed in accordance with the present invention.

FIG. 6 illustrates an exemplary HTML document with the appropriate HTML tag that indicates the support of auto-discovery. FIG. 7 illustrates the screenshot of exemplary customization content sent to a user via a feed, according to an embodiment of the invention. In this exemplary screenshot, the user can select categories that are of interest to him or her by checking the appropriate checkboxes. FIG. 8 illustrates the screenshot of an exemplary feed provided to a user. In this exemplary feed, the user can rank the relevance of the feed by checking the appropriate checkbox indicating the feed's usefulness.

Figure 9:
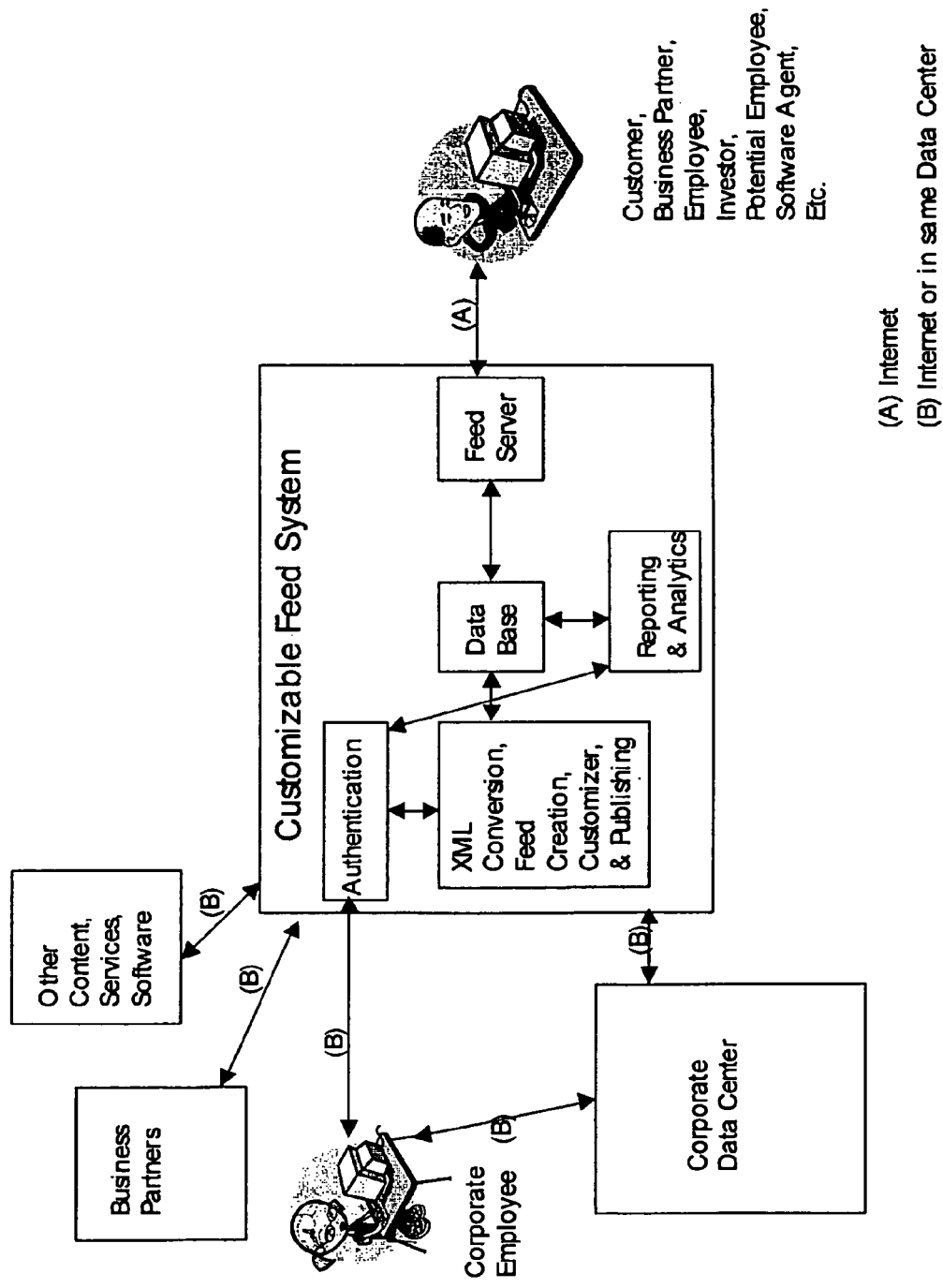
FIG. 9 illustrates one embodiment of an exemplary architecture of a customizable feed system and its interactions with various entities and constituencies in accordance with the present invention.
Figure 10:
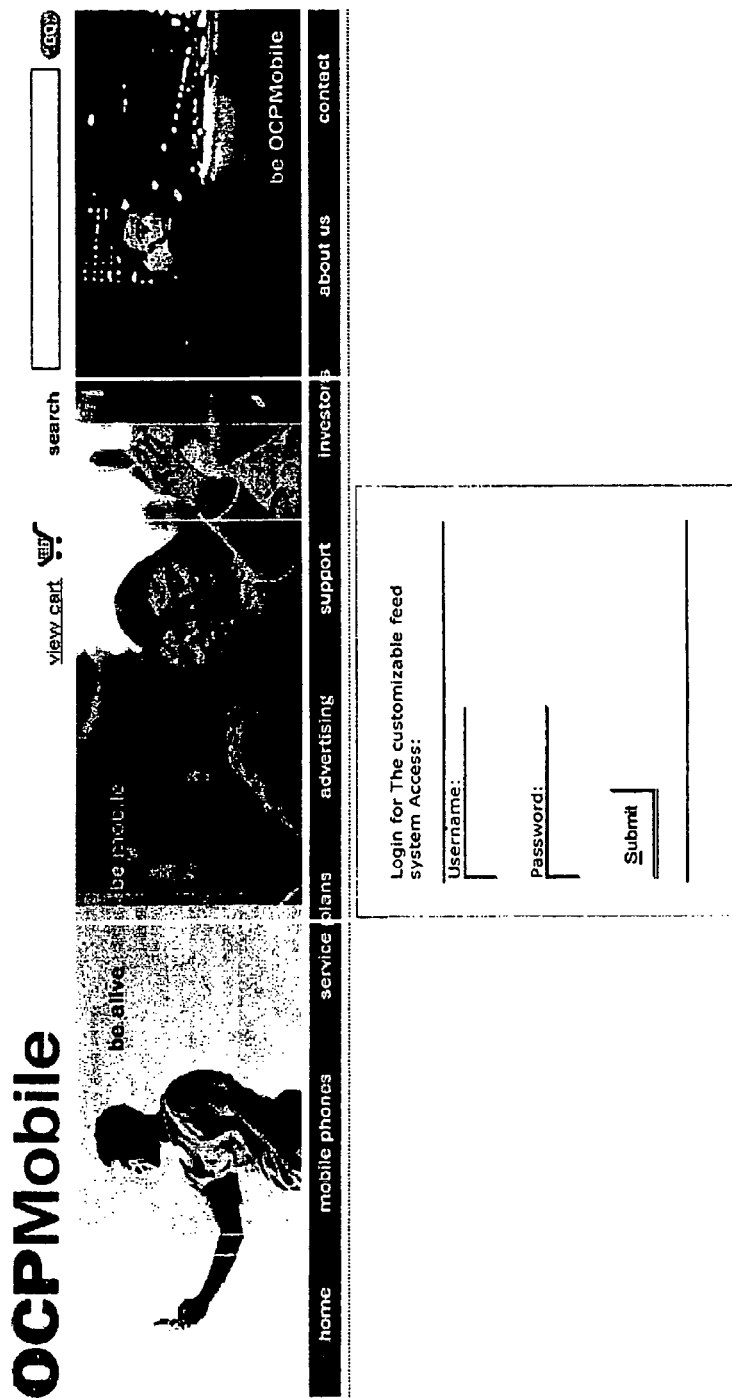
FIG. 10 illustrates one embodiment of the screenshot of an exemplary web page that allow a publisher to login to a customizable feed system in accordance with the present invention.
Figure 11:
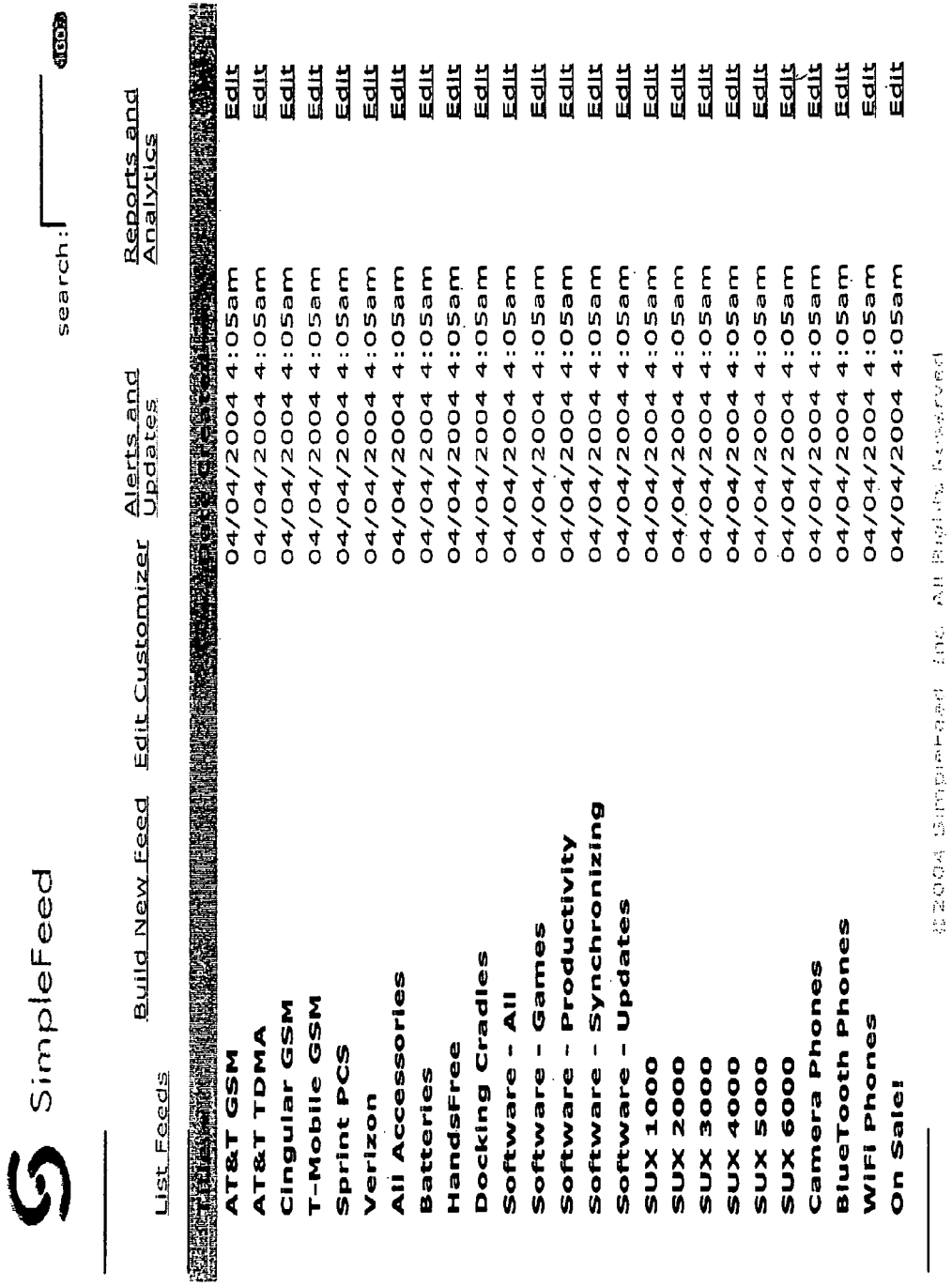
FIG. 11 illustrates one embodiment of the screenshot of an exemplary web page that allows a publisher to view existing feeds, create new feeds, review alerts and updates, and generate reports for analysis in accordance with the present invention.

FIG. 9 illustrates an exemplary architecture of a customizable feed system (e.g., the system 100) and its interactions with various entities and constituencies. FIG. 10 illustrates the screenshot of an exemplary web page that allow the publisher 102 to login to the system 100 according to an embodiment of the invention. FIG. 11 illustrates the screenshot of an exemplary web page of the system 100 that allows the publisher 102 to view existing feeds, create new feeds, review alerts and updates about the system 100, and generates reports for analysis.

Figure 14:
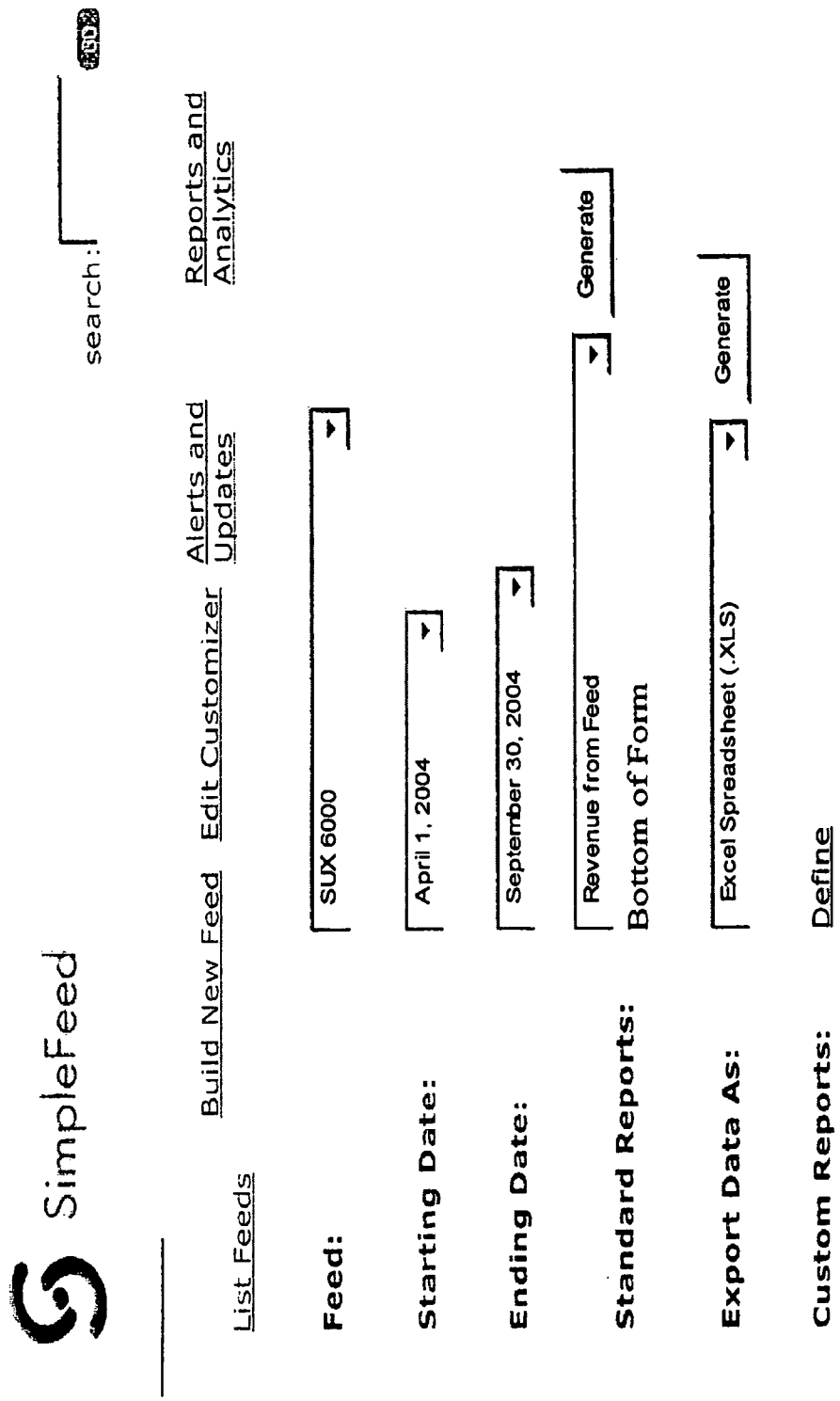
FIG. 14 illustrates one embodiment of the screenshot of an exemplary web page that allows a publisher to generate a report on feed use in accordance with the present invention.
Figure 15:
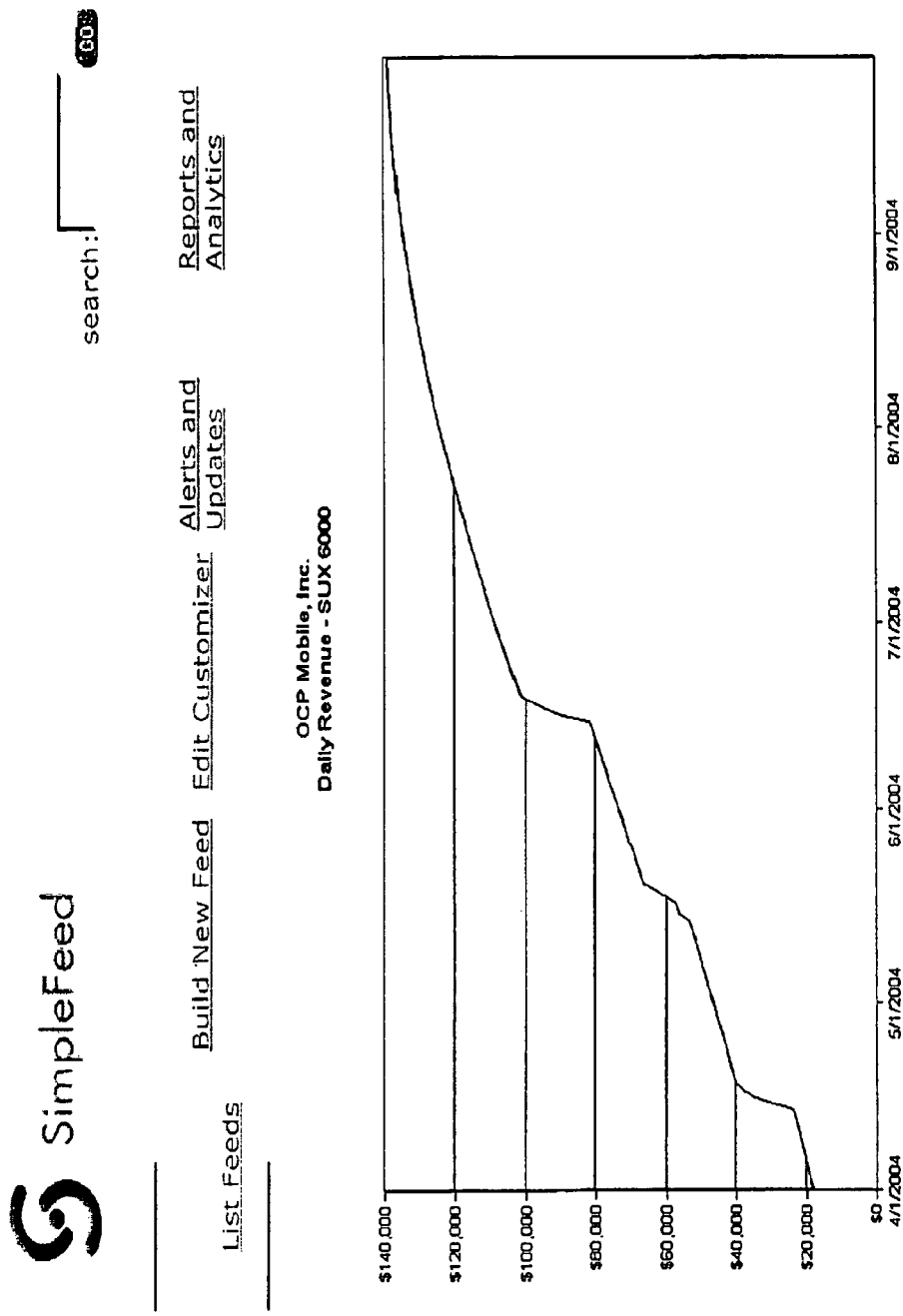
FIG. 15 illustrates one embodiment of the screenshot of an exemplary report in graph form in accordance with the present invention.

FIGS. 12a and 12b illustrate screenshots of exemplary web pages of the system 100 that allows the publisher 102 to create, categorize, and publish a feed. Also shown (in FIG. 12b) is one embodiment of using selection boxes to tag content. FIG. 13 illustrates the screenshot of an exemplary web page of the system 100 that allows the publisher 102 to specify the data source of a feed and to customize the feed's format (e.g., the feed's "look and feel"). FIG. 14 illustrates the screenshot of an exemplary web page of the system 100 that allows the publisher 102 to generate a report on feed use by specifying the feed, starting date, ending date, the type of report, and the format of the report. FIG. 15 illustrates the screenshot of an exemplary report in graph form generated by the system 100.

Figure 16:
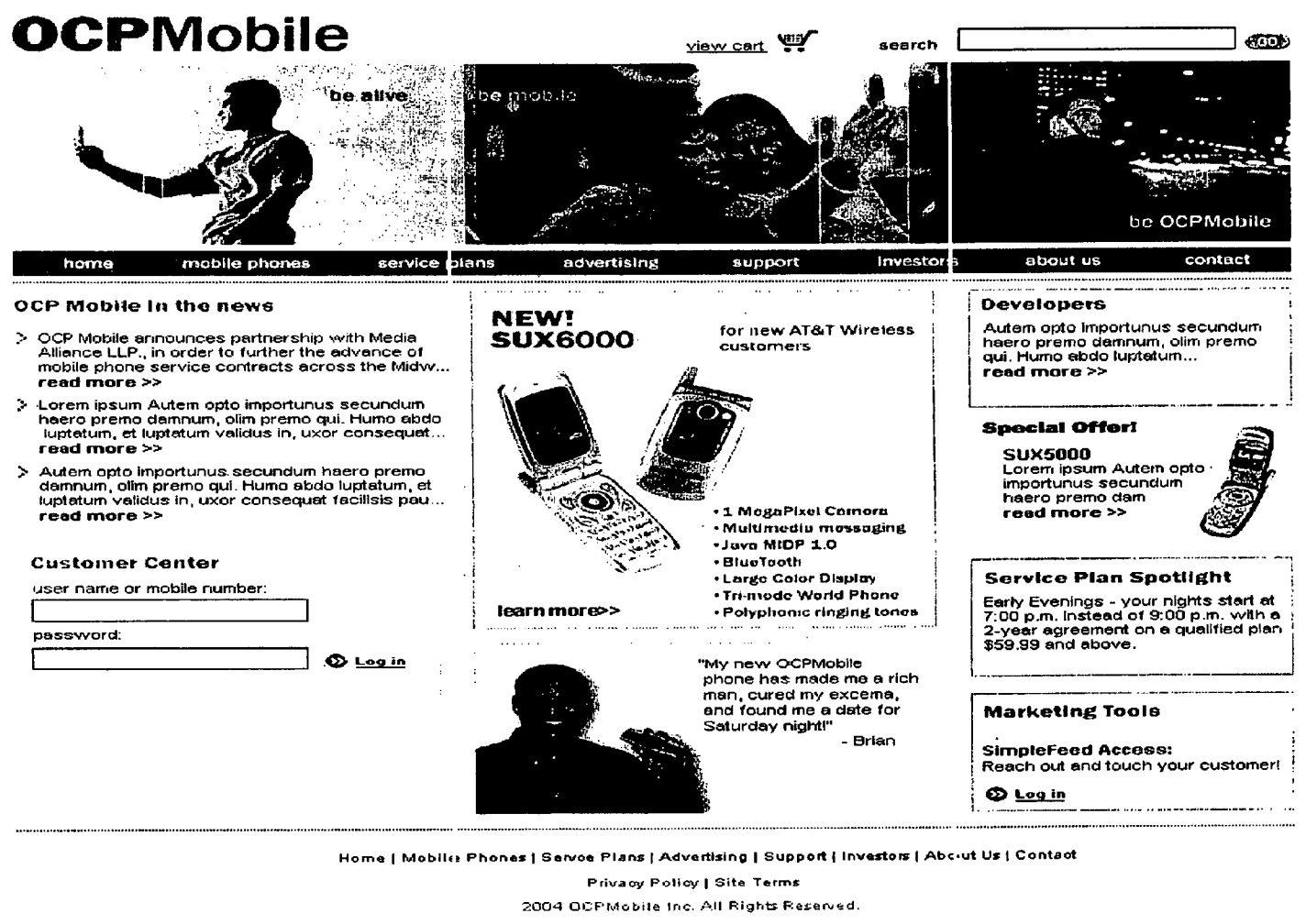
Figure 17:
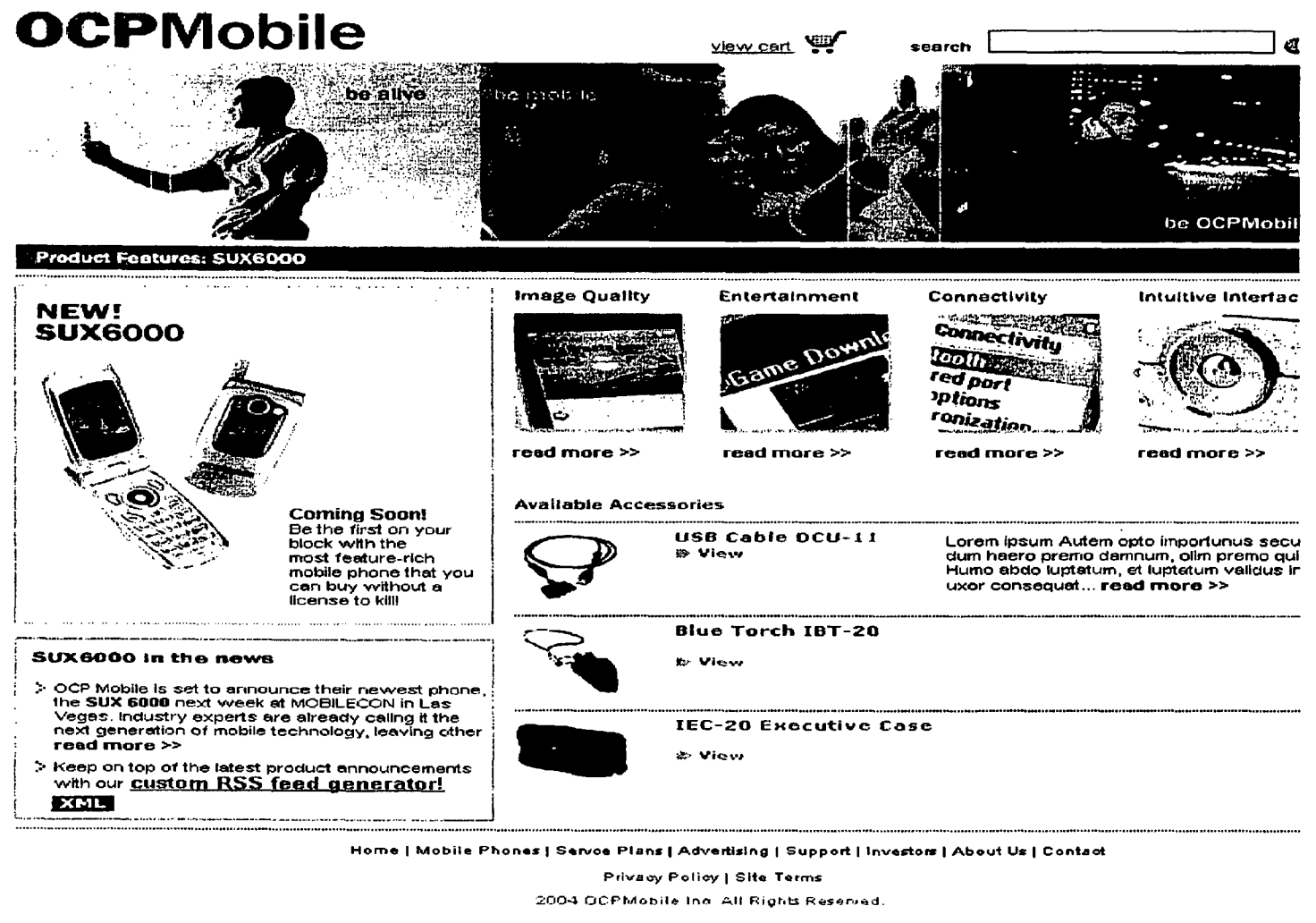
Figure 18:
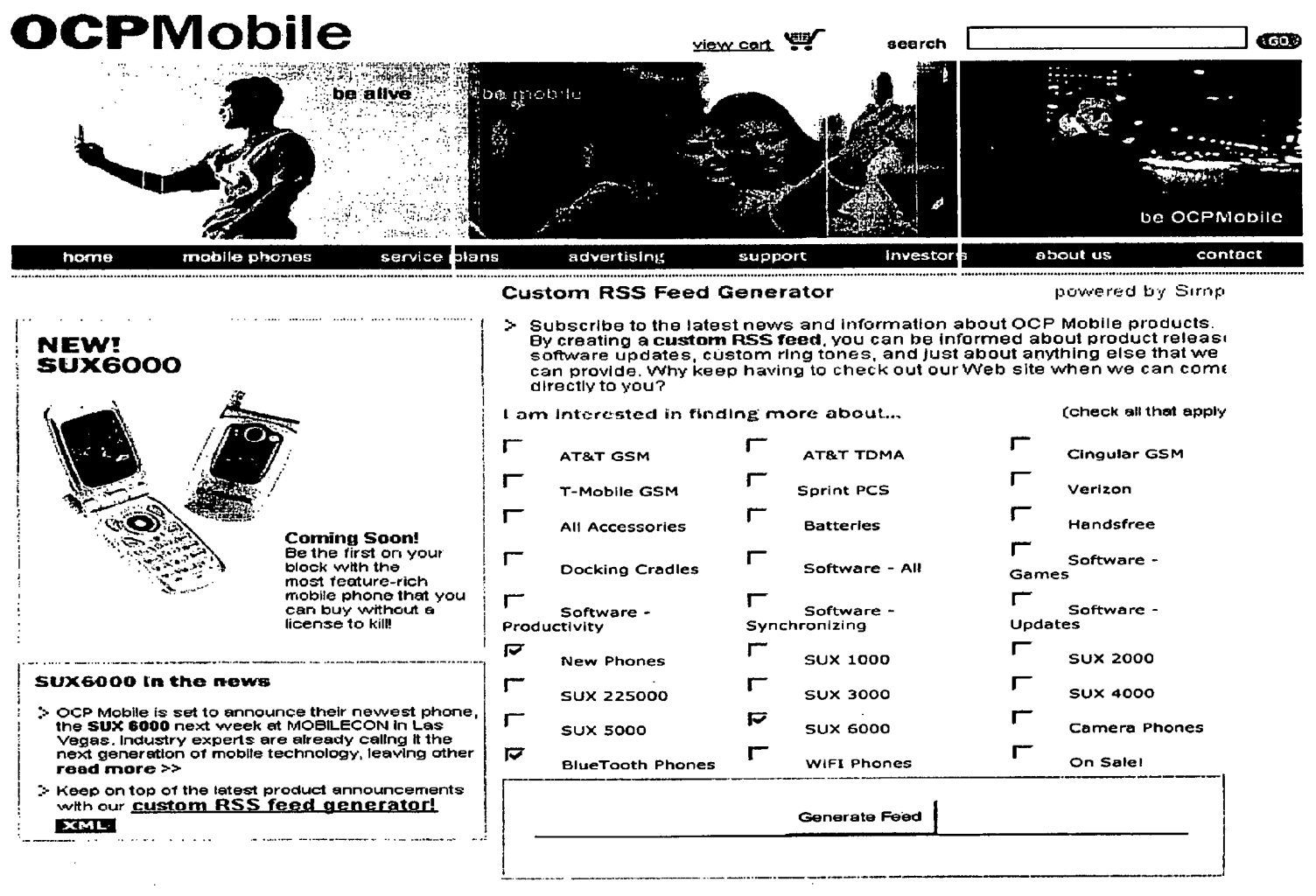
Figure 19:
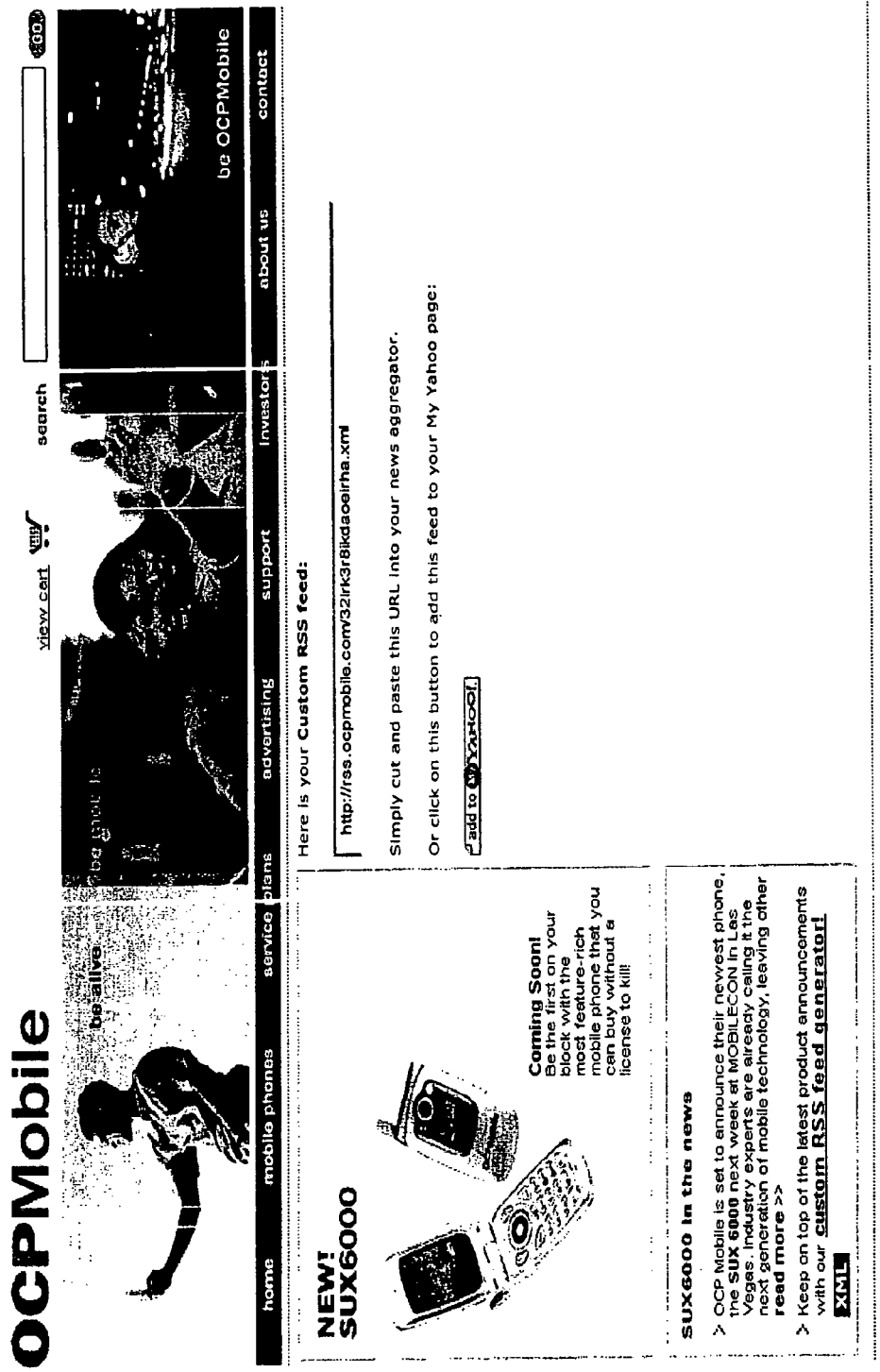
FIG. 19 illustrates one embodiment of the screenshot of an exemplary web page providing a unique identifier from which a user can access a personalized feed in accordance with the present invention.

FIG. 16 illustrates the screenshot of an exemplary web page that supports personalized feeds. In response to the user 104 clicking on the product promotion on this exemplary web page, the user 104 is directed to another exemplary web page illustrated in FIG. 17, which displays an XML icon indicating the availability of feeds. If the user 104 clicks on the XML icon, he or she is directed to another exemplary web page displaying customization content, as illustrated in FIG. 18. The user 104 can select his or her categories of interest at this web page by checking the appropriate checkboxes. In response to the user 104 submitting his or her categories of interest, a web page is displayed to the user 104, as shown in FIG. 19. This web page provides a unique identifier such as a unique URL from which the user 104 can access a feed that has been personalized according to the interests of the user 104. The exemplary web page shown in FIG. 19 also displays an "add to MyYahoo" icon. If the user 104 clicks on the "add to MyYahoo" icon, the user 104 is directed to his or her MyYahoo page, which is a popular third-party Internet portal. The personalized feed content is automatically added to the MyYahoo page of the user 104. In an embodiment of the invention, other third-party Internet portals may be used instead of MyYahoo to provide personalized feed content to the user 104.

Upon reading this disclosure, those of skill in the art will appreciate still additional alternative structural and functional designs for a system and a process for a personalized feed through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer implemented method of providing a personalized feed to a user, the method comprising:
    receiving an input from the user, the input specifying one or more categories that are of interest to the user;
    generating a unique identifier to assign to the user in response to receiving the input, wherein the unique identifier provides access to a feed;
    receiving a first request for content;
    identifying, based on the received input, content that is relevant to the user;
    responsive to receiving the first request for content, generating a feed including the identified content, wherein the feed comprises dynamically generated information with extensible markup language (XML) tags, the feed including the unique identifier and comprising a plurality of content items packaged into an XML container format, the XML container format requiring a sequence of content items having the same pre-specified structure, the XML container format suitable for processing by a feed aggregator application for aggregating syndicated web content;
    evaluating whether a predetermined quality service level is present and responsive to the presence determining whether the transmission of the feed should be delayed; and
    providing the generated feed to the user via the unique identifier.

2. The method of claim 1, wherein the unique identifier comprises at least one of a uniform resource identifier, IP address, a cookie, a digital certificate, a machine fingerprint.

3. The method of claim 1, wherein receiving the input from the user comprises:

providing customization content to the user, the customization content indicating one or more categories of content; and
receiving the input from the user via the customization content.

4. The method of claim 3, wherein the customization content is provided
to the user via one of a customization feed, a customization web page, or insertion within a regular feed for customization.

5. The method of claim 1, wherein identifying the content that is relevant to the user comprises:
identifying the content whose category matches the one or more categories specified in the received input.

6. The method of claim 1, further comprising:
tracking an action of the user with respect to the provided feed via the unique identifier;
customizing the feed based on the action of the user with respect to the provided feed; and
providing the customized feed to the user.

7. The method of claim 6, further comprising:
generating a report on the action of the user to analyze the user's feed usage.

8. The method of claim 1, further comprising:
receiving an input from the user regarding a relevance of the provided feed;
customizing the feed based on the received Input; and
providing the customized feed to the user.

9. The method of claim 1, wherein generating the feed comprises:
removing a formatting of the identified content;
identifying a template suitable for the user; and
generating the feed including the content in accordance with the identified template.

10. The method of claim 1, wherein providing the generated feed to the user comprises:
encrypting the content using one or more security attributes of the user; and
providing the feed including the encrypted content to the user.

11. The method of claim 1, wherein providing the generated feed to the user comprises:
authenticating a creator of the content using a digital signature; and
providing the feed including the authenticated content to the user.

12. The method of claim 1, wherein generating the feed further comprises inserting a mnemonic identifier in a feed URL.

13. The method of claim 1, wherein evaluating further comprises providing the feed in response to a predetermined bandwidth utilization.

14. A system for providing a personalized feed to a user, the system comprising:
a user profile module configured to receive an input from the user, the input specifying one or more categories that are of interest to the user;
an identification module configured to generate a unique identifier to assign to the user in response to receiving the input, wherein the unique identifier provides access to a feed; and
a feed personalization module configured to identify, based on the received input, content that is relevant to the user, the feed personalization module further configured to receive a request for content from the user, generate a feed including the identified content responsive to receiving the request for content from the user, wherein the feed comprises dynamically generated information with extensible markup language (XML) tags, the feed including the unique identifier and comprising a plurality of content items packaged into an XML container format, the XML container format requiring a sequence of content items having the same pre-specified structure, the XML container format suitable for processing by a feed aggregator application for aggregating syndicated web content, to evaluate whether a predetermined quality service level is present and responsive to the presence to determine whether the transmission of the feed should be delayed, and to provide the generated feed to the user via the unique identifier.

15. The system of claim 14, wherein the unique identifier comprises at least one of: a uniform resource identifier, IP address, a cookie, machine fingerprint, a digital certificate.

16. The system of claim 14, wherein the user profile module is configured to:
receive the input from the user via customization content, the customization content indicating one or more categories of content.

17. The system of claim 16, wherein the customization content is provided to the user via a customization feed or a customization web page.

18. The system of claim 14, wherein the feed personalization module is configured to identify the content that is relevant to the user by:
identifying the content whose category matches the one or more categories specified in the received input.

19. The system of claim 14, further comprising:
a user interest builder module configured to track an action of the user with respect to the provided feed via the unique identifier, wherein the feed personalization module is configured to customize the feed based on the action of the user with respect to the provided feed and to provide the customized feed to the user.

20. The system of claim 19, further comprising:
a report module configured to generate a report on the action of the user to analyze the user's feed usage.

21. The system of claim 14, further comprising:
a user interest builder module configured to receive an input from the user regarding a relevance of the provided feed, wherein the feed personalization module is configured to customize the feed based on the
received input and to provide the customized feed to the user.

22. The system of claim 14, further comprising:
a content processing module configured to remove a formatting of the identified content; and
a content formatting module configured to identify a template suitable for the user, wherein the feed personalization module is configured to generate the feed including the content in accordance with the identified template.

23. The system of claim 14, further comprising:
an encryption module configured to encrypt the content using one or more security attributes of the user,
wherein the feed personalization module is configured to provide the feed including the encrypted content to the user.

24. The system of claim 14, further comprising:
an authentication module configured to authenticate a creator of the content using a digital signature,
wherein the feed personalization module is configured to provide the feed including the authenticated content to the user.

25. The system of claim 14, wherein a feed personalization module is further configured to insert a mnemonic identifier in a feed URL.

26. The system of claim 14, wherein the feed personalization module is further configured to provide the feed in response to a predetermined bandwidth utilization.

27. A computer program product having a computer-readable medium having embodied thereon program code for providing a personalized feed to a user, the program code comprising:
   a user profile module configured to receive an input from the user, the input specifying one or more categories that are of interest to the user;
   an identification module configured to generate a unique identifier to assign to the user in response to receiving the input, wherein the unique identifier provides access to a feed; and
   a feed personalization module configured to identify, based on the received input, content that is relevant to the user, the feed personalization module further configured to receive a request for content from the user, generate a feed including the identified content responsive to receiving the request for content from the user, wherein the feed comprises dynamically generated information with extensible markup language (XML) tags, the feed including the unique identifier and comprising a plurality of content items packaged into an XML container format, the XML container format requiring a sequence of content items having the same pre-specified structure, the XML container format suitable for processing by a feed aggregator application for aggregating syndicated web content, to evaluate whether a predetermined quality service level is present and responsive to the presence to determine whether the transmission of the feed should be delayed, and to provide the generated feed to the user via the unique identifier.

28. The computer program product of claim 27, wherein the unique identifier comprises at least one of: a uniform resource identifier, IP address, a cookie, machine fingerprint, a cookie, a digital certificate.

29. The computer program product of claim 27, wherein the user profile module is configured to:
   receive the input from the user via customization content, the customization content indicating one or more categories of content.

30. The computer program product of claim 29, wherein the customization content is provided to the user via a customization feed or a customization web page.

31. The computer program product of claim 27, wherein the feed personalization module is configured to identify the content that is relevant to the user by:
   identifying the content whose category matches the one or more categories specified in the received input.

32. The computer program product of claim 27, wherein the program code further comprises:
   a user interest builder module configured to track an action of the user with respect to the provided feed via the unique identifier, wherein the feed personalization module is configured to customize the feed based on the action of the user with respect to the provided feed and to provide the customized feed to the user.

33. The computer program product of claim 32, wherein the program code further comprises:
   a report module configured to generate a report on the action of the user to analyze the user's feed usage.

34. The computer program product of claim 27, wherein the program code further comprises:
   a user interest builder module configured to receive an input from the user regarding a relevance of the provided feed; and
   wherein the feed personalization module is configured to customize the feed based on the received input and to provide the customized feed to the user.

35. The computer program product of claim 27, wherein the program code further comprises:
   a content processing module configured to remove a formatting of the identified content; and
   a content formatting module configured to identify a template suitable for the user, wherein the feed personalization module is configured to generate the feed including the content in accordance with the identified template.

36. The computer program product of claim 27, wherein the program code further comprises:
   an encryption module configured to encrypt the content using one or more security attributes of the user, wherein the feed personalization module is configured to provide the feed including the encrypted content to the user.

37. The computer program product of claim 27, wherein the program code further comprises:
   an authentication module configured to authenticate a creator of the content using a digital signature,
   wherein the feed personalization module is configured to provide the feed including the authenticated content to the user.

38. The computer program product of claim 27, wherein a feed personalization module configured to insert a mnemonic identifier in a feed URL.

39. The computer program product of claim 27, wherein the feed personalization module is further configured to provide the feed in response to a predetermined bandwidth utilization.

40. The method of claim 1, wherein request for content is received from a computer implemented user agent.

41. The method of claim 1, further comprising:
   generating a URL that incorporates the unique identifier; and
   sending the URL to the user.

42. The method of claim 1, wherein the feed comprises extensible markup language metadata describing changes to feed information that allows a client-side agent to retrieve updated feed information.

* * * * *

UNITED STATES PATENT AND TRADEMARK OFFICE
CERTIFICATE OF CORRECTION

PATENT NO. : 8,065,383 B2
APPLICATION NO. : 11/129634
DATED : November 22, 2011
INVENTOR(S) : Hilding M. Carlson et al.

Page 1 of 1

It is certified that error appears in the above-identified patent and that said Letters Patent is hereby corrected as shown below:

Column 18, line 39, after "module" add "is".

Signed and Sealed this
Twenty-eighth Day of February, 2012

David J. Kappos
*Director of the United States Patent and Trademark Office*